(12) United States Patent
Skeen et al.

(10) Patent No.: US 8,856,170 B2
(45) Date of Patent: Oct. 7, 2014

(54) BANDSCANNER, MULTI-MEDIA MANAGEMENT, STREAMING, AND ELECTRONIC COMMERCE TECHNIQUES IMPLEMENTED OVER A COMPUTER NETWORK

(71) Applicant: Opus Deli, Inc., Berkeley, CA (US)

(72) Inventors: Wayne Donald Maddock Skeen, Berkeley, CA (US); Christopher Thomas Ross, Berkeley, CA (US)

(73) Assignee: Opus Deli, Inc., Emeryville, CA (US)

( * ) Notice: Subject to any disclaimer, the term of this patent is extended or adjusted under 35 U.S.C. 154(b) by 0 days.

(21) Appl. No.: 13/844,656

(22) Filed: Mar. 15, 2013

(65) Prior Publication Data

US 2014/0188911 A1     Jul. 3, 2014

Related U.S. Application Data

(63) Continuation-in-part of application No. 13/517,505, filed on Jun. 13, 2012, now Pat. No. 8,732,193.

(60) Provisional application No. 61/713,580, filed on Oct. 14, 2012.

(51) Int. Cl.
    *G06F 17/30*         (2006.01)
    *G06Q 10/00*        (2012.01)
    *G06Q 30/00*        (2012.01)

(52) U.S. Cl.
    CPC .... *G06F 17/30053* (2013.01); *G06F 17/30772* (2013.01); *G06F 17/30752* (2013.01)
    USPC ........... 707/769; 707/736; 707/803; 709/201; 709/231; 715/716; 715/719; 715/727; 705/5; 705/14.23; 705/26.1

(58) Field of Classification Search
    CPC .................... G06F 17/30743; G06F 17/30749; G06F 17/30772; G06Q 10/02; G10H 2240/125
    USPC .................. 707/736, 769, 803; 709/201, 231; 715/716, 719, 727; 705/5, 14.23, 705/14.38, 14.58, 27.1, 26.1
    See application file for complete search history.

(56) References Cited

U.S. PATENT DOCUMENTS 6,925,458 B2 *   8/2005   Scaturro et al. ........................ 1/1
7,693,978 B2 *   4/2010   Eliason et al. ................ 709/223

(Continued)

OTHER PUBLICATIONS

Roger Zimmermann, Elaine Chew, Sakire Arslan, and Moses Pawar (University of Southern California), "Distributed Musical Performances: Architecture and Stream Management", ACM Transactions on Multimedia Computing, Communications and Applications, vol. 4, No. 2, May 2008, pp. 1-23.*

(Continued)

*Primary Examiner* — Cheryl Lewis
(74) *Attorney, Agent, or Firm* — EcoTech Law Group, P.C.; Dean E. Wolf, Esq.

(57) ABSTRACT

Various aspects disclosed herein are directed to different techniques for: analyzing webpage content, and identifying references to artist names. When a match is identified, the web page may be dynamically and automatically modified to causes display of a "play" button next to the matched artist name displayed on the webpage. When the play button is selected by a user, this may cause a streaming media player to open at the user's system and begin playing streamed music relating to the matched artist.

17 Claims, 13 Drawing Sheets

(56) References Cited

U.S. PATENT DOCUMENTS

| | | | |
|---|---|---|---|
| 7,720,871 B2 | 5/2010 | Rogers et al. | |
| 8,392,206 B2* | 3/2013 | Parekh et al. | 705/1.1 |
| 8,487,173 B2* | 7/2013 | Emmerson | 84/601 |
| 8,655,692 B2* | 2/2014 | Junkin | 705/5 |
| 8,732,193 B2* | 5/2014 | Skeen et al. | 707/769 |
| 2003/0076963 A1* | 4/2003 | Wells | 381/1 |
| 2004/0093325 A1 | 5/2004 | Banerjee et al. | |
| 2007/0105664 A1 | 5/2007 | Scheinert et al. | |
| 2008/0104627 A1* | 5/2008 | Avedissian | 725/25 |
| 2009/0144244 A1 | 6/2009 | Maghoul et al. | |
| 2012/0047077 A1* | 2/2012 | Humphrey | 705/300 |
| 2012/0239526 A1* | 9/2012 | Revare | 705/26.8 |
| 2012/0330697 A1* | 12/2012 | Smith et al. | 705/5 |
| 2014/0032325 A1* | 1/2014 | Weiss et al. | 705/14.58 |
| 2014/0046775 A1* | 2/2014 | Harb | 705/14.66 |

OTHER PUBLICATIONS

Yves Raimond, Christopher Sutton, and Mark Sandler, "The Many Faces of Semantics: Interlinking Music-Rlated Data on the Web", IEEE, 2009, pp. 1-12.*

Alain B. Renaud, Alexander Corot, and Pedro Rebelo, "Networked Music Performance: State of the Art", AES 30th International Conference, Saariselka, Finland, Mar. 15-17, 2007, pp. 1-7.*

PCT International Search Report, PCT Application No. PCT/US2012/042306, International Filing Date Jun. 13, 2012, Search report mailed Dec. 18, 2012.

PCT International Written Opinion, PCT Application No. PCT/US2012/042306, International Filing Date Jun. 13, 2012, Search report mailed Dec. 18, 2012.

www.STracks.com, website printout, printed Jun. 20, 2012.
www.artistgrowth.com, website printout, Jun. 20, 2012.
www.bandcamp.com, website printout, Jun. 20, 2012.
www.bandsintown.com, website printout, Jun. 20, 2012.
www.carbits.com, website printout, Jun. 20, 2012.
www.grooveshark.com website printout, Jun. 20, 2012.
www.iheart.com, website printout, Jun. 20, 2012.
www.jango.com, website printout, Jun. 20, 2012.
www.last.fm, website printout Jun. 20, 2012.
https://apps.facebook.com/concertcalendar/#, website printout Jun. 20, 2012.
https://mog.com, website printout Jun. 20, 2012.
www.myspace.com, website printout Jun. 20, 2012.
www.pandora.com, website printout Jun. 20, 2012.
www.rdio.com,website printout Jun. 20, 2012.
www.reverbnation.com, website printout Jun. 20, 2012.
www.slacker.com, website printout Jun. 20, 2012.
www.getsongbird.com website printout Jun. 20, 2012.
www.songza.com, website printout Jun. 20, 2012.
www.soundcloud.com, website printout Jun. 20, 2012.
www.spotify.com/us/desktop-splash/?utm_source+spotify&utm_medium+web&utm_campaign+start, website printout Jun. 20, 2012.
www.turntable.fm, website printout Jun. 20, 2012.

* cited by examiner

```
<!--   Begin DeliRadio BandScanner Code   -->
<script
src=" http://ajax.googleapis.com/ajax/libs/jquery/1.8.0/jquery.min.js "></script>
<script src=" http://deliradio-
net.s3.amazonaws.com/DeliRadio/DeliRadio.bandscanner.current.js "></script>
<script type="text/javascript">
    $(document).ready(function () {
        $('td').DRBandScanner();
    });
</script>
<!--   End DeliRadio BandScanner Code   -->
```

Fig. 9A

```
<script src=" http://deliradio-net.s3.amazonaws.com/DeliRadio.bandscanner.current.js"></script>

(function ($) {
    $.fn.DRBandScanner = function (options) {
        var elements = this;
        var init = function (options) {
            var appendStringTpl = '<{appendTag} class="deli-link" style="padding-left: 5px; padding-top:
0px; margin: 0px; text-indent:-9999px; position: relative; top: 3px;"><a href={link} target=_blank"
><img src="http://deliradio.net/i/c/cp1.png" width="14" height="14" border="0"/></a></{appendTag}>';
            var settings = $.extend({
                'data': buildData(),
                'appendTag': 'span',
                'template' : appendStringTpl,
                'success': onSuccess
            }, options);
            appendStringTpl = appendStringTpl.replace('{appendTag}', settings.appendTag);
            function buildData() {
                var data = elements.map(function () {
                    var text = $(this).text();
                    if(text.match(/^[\ w\ d\ \ ' \ "]+$/))
                        return text;
                });
                var obj = {
                    artists :     $.makeArray(data)
                };

return $.param(obj);
            }
            function buildAppendString(artistLink) {
                return appendStringTpl.replace('{link}', artistLink);
            }
            function onSuccess(data, textStatus) {
                elements.each(function (index, element) {
                    element = $(element);
                    artist = data[element.text()];
                    if (artist) {
                        var link = " http://deliradio.com/player?play=band&id={artistId}&startTrack=undefined&band_
                            search=undefined&utm_source=DRNET&utm_medium=BUTTON
                            ".replace("{artistId}", artist.id);   element.append(buildAppendString(link));
                            $(".deli-link > a", element).click(function (event) {
                                window.open(this.href, '_blank', ' width=300,height=700,location=1');
                                event.stopPropagation();
                                return false;
                            });
                    }
                });
            }
            $.ajax({
                type:   'GET',
                url: 'http://deliradio.com/bands/play ',
                contentType: 'application/json',
                data: settings.data,
                jsonpCallback: 'wtf',
                dataType: 'jsonp',
                success: settings.success
            });
        };
        init(options);
    }
})(jQuery);
```

BANDSCANNER, MULTI-MEDIA MANAGEMENT, STREAMING, AND ELECTRONIC COMMERCE TECHNIQUES IMPLEMENTED OVER A COMPUTER NETWORK

RELATED APPLICATION DATA

The present application claims benefit, pursuant to the provisions of 35 U.S.C. §119, of U.S. Provisional Application Ser. No. 61/713,580, titled "BANDSCANNER, MULTI-MEDIA MANAGEMENT, STREAMING, AND ELECTRONIC COMMERCE TECHNIQUES IMPLEMENTED OVER A COMPUTER NETWORK", naming Skeen et al. as inventors, and filed 14 Oct. 2012, the entirety of which is incorporated herein by reference for all purposes.

This application is a continuation-in-part application, pursuant to the provisions of 35 U.S.C. §120, of prior U.S. patent application Ser. No. 13/517,505 (Published as U.S. Pat. No. 8,732,193), titled "MULTI-MEDIA MANAGEMENT AND STREAMING TECHNIQUES IMPLEMENTED OVER A COMPUTER NETWORK", naming SKEEN, et. al. as inventors, and filed 13 Jun. 2012, the entirety of which is incorporated herein by reference for all purposes.

BACKGROUND

The present disclosure relates to network-based information searching and content delivery. More particularly, the present disclosure relates to multi-media management and streaming techniques implemented over a computer network.

BRIEF DESCRIPTION OF THE DRAWINGS

FIGS. 7-9B illustrate example screenshots of various graphical user interfaces (GUIs) which may be used to facilitate, initiate and/or perform various operation(s) and/or action(s) relating to one or more of the MMMS aspects disclosed or referenced herein.

DETAILED DESCRIPTION OF EXAMPLE EMBODIMENTS

Overview

Figure 1:
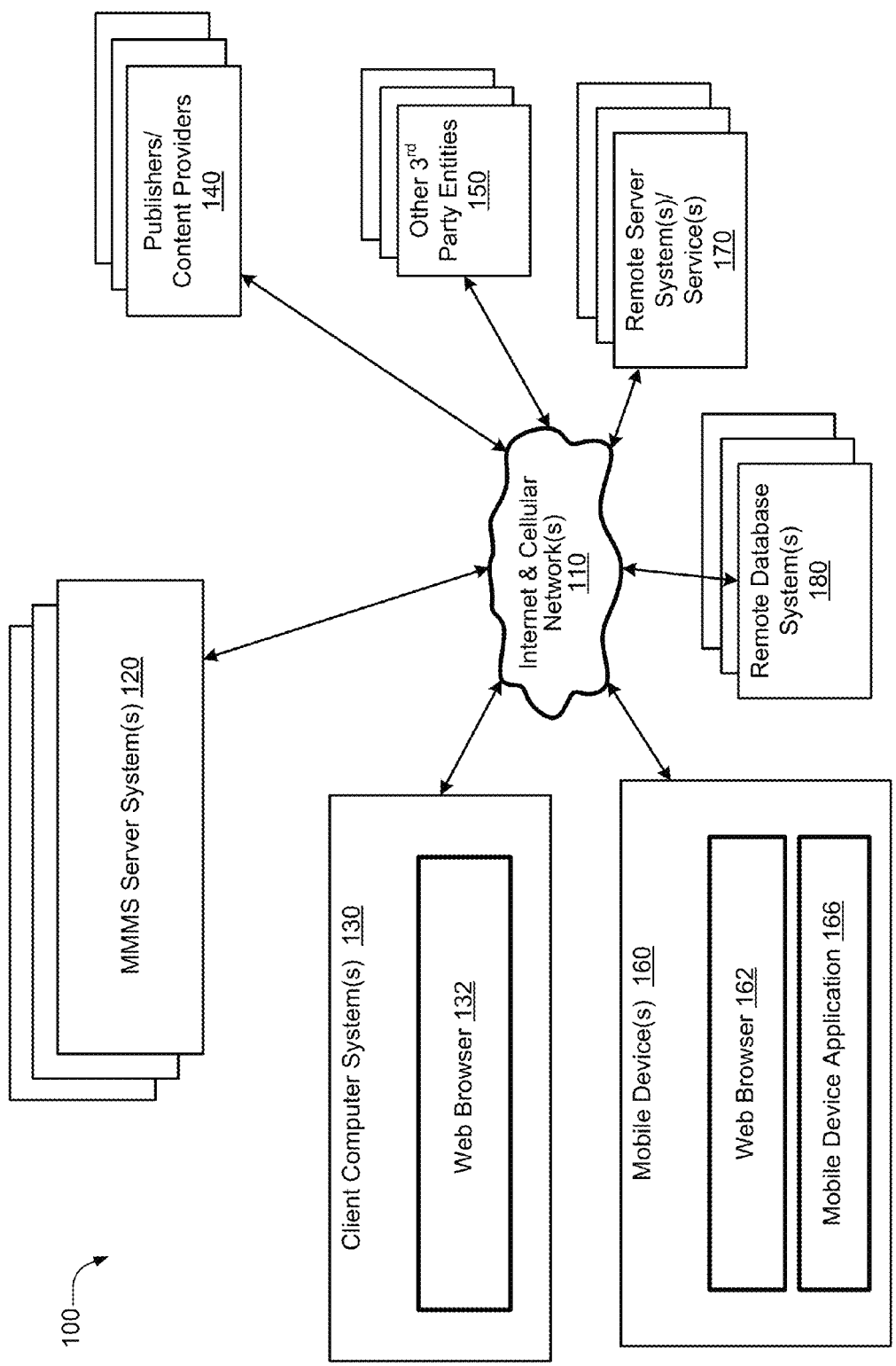
FIG. 1 illustrates a simplified block diagram of a specific example embodiment of a Multi-Media Management and Streaming (MMMS) System 100 which may be implemented in network portion 100.

Various aspects described or referenced herein are directed to different methods, systems, and computer program products relating to multi-media management and streaming techniques implemented over a computer network. One aspect disclosed herein is directed to different methods, systems, and computer program products for implementing BandScanner functionality as described herein.

Several aspects disclosed herein are directed to different methods, systems, and computer program products for facilitating user access to multimedia content via a computer network. In at least one embodiment, various method(s), system(s) and/or computer program product(s) may be operable to: access a first portion of content associated with an Internet-based webpage; analyze the first portion of content for references to artist names or band names; identify a first set of artists/band names referenced in the first portion of content; search, using the first set of artist/band names, a first database for artist or band names which match at least one of the artist or band names in the first set of artist/band names; identify, from the first database, a first artist or band which matches at least one of the artist or band names in the first set of artists/band names; generate webpage modification instructions which include information relating to the first artist or band; cause, using the webpage modification instructions, modification of a second portion of content of the Internet-based webpage to thereby generate a modified second portion of content; wherein the modification of the second portion of content includes insertion of a first hyperlinked object into the second portion of content to thereby generate the modified second portion of content; configure the modified second portion of content for display at a client system in a manner such that, when a user clicks on the displayed first hyperlinked object, the client system is caused to access a first streaming media station from a remote server, and is caused to play the streaming media at the client system. In at least one embodiment, the first streaming media station is configured to stream music performed by the first artist or band.

Additional objects, features and advantages of the various aspects described or referenced herein may become apparent from the following description of its preferred embodiments, which description may be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Various aspects described or referenced herein are directed to different methods, systems, and computer program products relating to multi-media management and streaming techniques implemented over a computer network. According to various embodiments disclosed herein, a Multi-Media Management and Streaming (MMMS) System may be configured or designed to provide online users with "location based" streaming radio functionality. Users from different geographic locations may access a variety of MMMS System GUIs to search for, create, and/or share customized streaming radio stations which may be configured to identify and play/stream music associated with one or more of the following (or combinations thereof):

Upcoming shows;
Bands/Artists;
Venue related events;
Online streaming radio stations;
Online streaming video stations;
Etc.

In at least one embodiment, the MMMS System may include functionality for enabling users to selectively filter search results and/or presented content according to a variety of different filtering criteria such as, for example, one or more of the following (or combinations thereof):

geographic location;
geographic proximity;
time/date criteria;
venue name(s);
music genre(s);
video genre(s);
artist/band name(s)
user ID;
geographic location of artist/band origin (e.g., home town);
geographic location of upcoming shows and/or events;
geographic proximity of upcoming shows and/or events;
etc.

In at least some embodiments described herein, the terms "DeliRadio" and "DeliRadio System" may refer to one or more embodiments of the MMMS System (and/or portions thereof), such as, for example, those corresponding to the website system(s), GUI(s), and music streaming service(s) associated with the website domain DeliRadio.com (www.DeliRadio.com). Thus, for example, as used herein, the terms "MMMS System", "DeliRadio", and "DeliRadio System" may be used interchangeably, unless otherwise noted. Additionally, at least some embodiments described herein, the terms "Artist" or "Band" may be used interchangeably to refer to one or more of the following (or combinations thereof): music related artist(s)/band(s), songwriters, composers, performers, etc.

FIG. 1 illustrates a simplified block diagram of a specific example embodiment of a Multi-Media Management and Streaming (MMMS) System 100 which may be implemented in network portion 100. As described in greater detail herein, different embodiments of MMMS Systems may be configured, designed, and/or operable to provide various different types of operations, functionalities, and/or features generally relating to MMMS System technology. Further, as described in greater detail herein, many of the various operations, functionalities, and/or features of the MMMS System(s) disclosed herein may provide may enable or provide different types of advantages and/or benefits to different entities interacting with the MMMS System(s).

Figure 6:
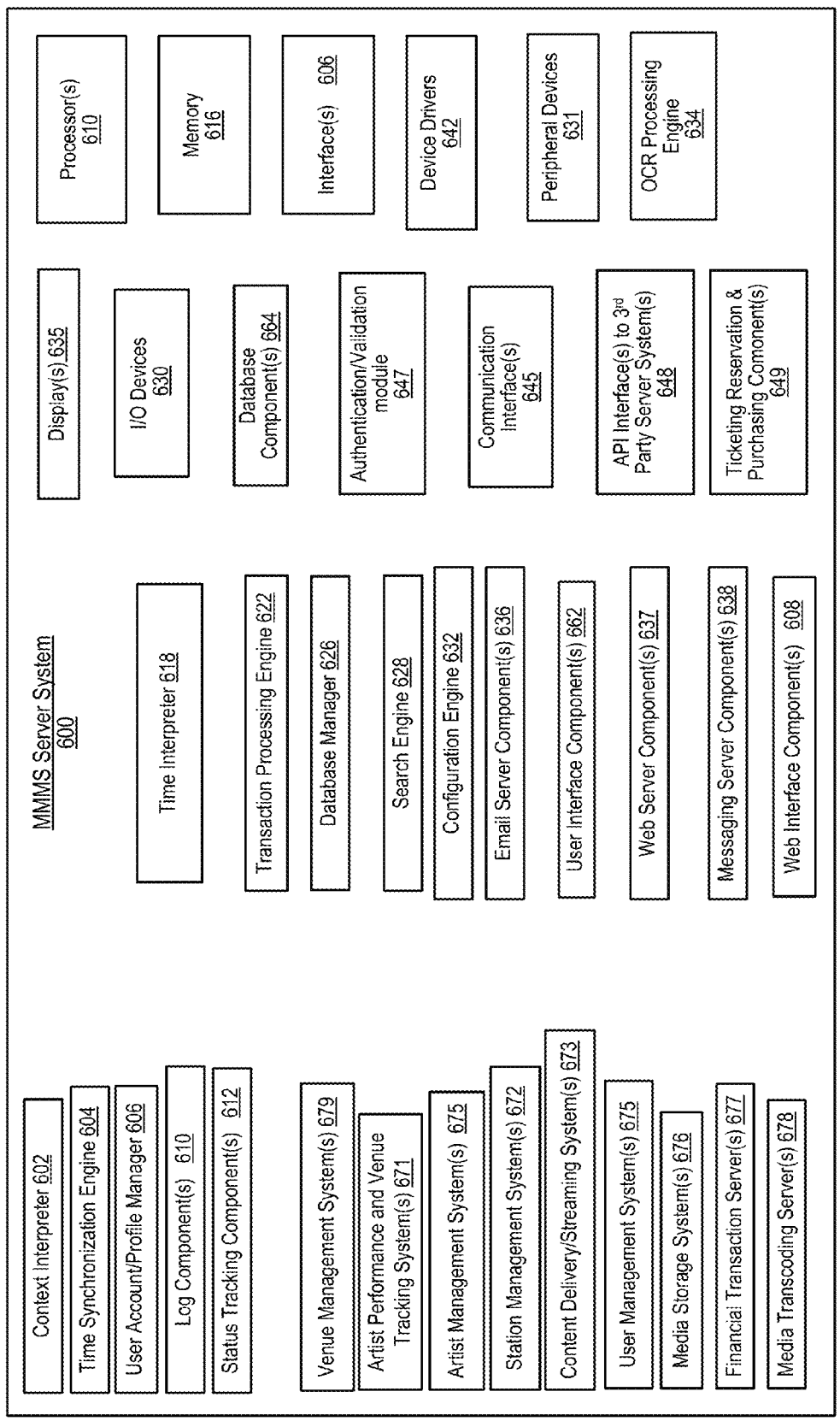
FIG. 6 illustrates an example of a functional block diagram of a MMMS Server System in accordance with a specific embodiment.

According to different embodiments, the MMMS System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the MMMS System may include one or more of the following types of systems, components, devices, processes, etc. (or combinations thereof):

- MMMS Server System(s) 120—In at least one embodiment, the MMMS Server System(s) may be operable to perform and/or implement various types of functions, operations, actions, and/or other features such as those described or referenced herein (e.g., such as those illustrated and/or described with respect to FIG. 6).
- Publisher/Content Provider System component(s) 140. In at least one embodiment, one or more devices, components, and/or systems of the MMMS System (100) may be operable to interface with external content sources via an import/export API to load information into the various storage devices and database within the MMMS System (120).
- Client Computer System (s) 130
- 3$^{rd}$ Party System(s)/Service(s) 150
- Internet & Cellular Network(s) 110
- Remote Database System(s) 180
- Remote Server System(s) 170, which, for example, may include, but are not limited to, one or more of the following (or combinations thereof):
  - Content provider servers/services
  - Media Streaming servers/services
  - Database storage/access/query servers/services
  - Financial transaction servers/services
  - Payment gateway servers/services
  - Electronic commerce servers/services
  - Event management/scheduling servers/services
  - Etc.
- Mobile Device(s) 160—In at least one embodiment, the Mobile Device(s) may be operable to perform and/or implement various types of functions, operations, actions, and/or other features such as those described or referenced herein (e.g., such as those illustrated and/or described with respect to FIG. 4). Additionally, in some embodiments, mobile devices which interact with the MMMS may offer additional unique functionality, including, but not limited to, temporal and geographic operations involving bands, events, users, and venues, enhanced social networking functionality, and photographic and videographic capture and transmission.
- Etc.

In at least one embodiment, the MMMS System may be operable to utilize and/or generate various different types of data and/or other types of information when performing specific tasks and/or operations. This may include, for example, input data/information and/or output data/information. For example, in at least one embodiment, the MMMS System may be operable to access, process, and/or otherwise utilize information from one or more different types of sources, such as, for example, one or more local and/or remote memories, devices and/or systems. Additionally, in at least one embodiment, the MMMS System may be operable to generate one or more different types of output data/information, which, for example, may be stored in memory of one or more local and/or remote devices and/or systems. Examples of different types of input data/information and/or output data/information which may be accessed and/or utilized by the MMMS System may include, but are not limited to, one or more of those described and/or referenced herein.

According to specific embodiments, multiple instances or threads of the MMMS System may be concurrently implemented and/or initiated via the use of one or more processors and/or other combinations of hardware and/or hardware and software. For example, in at least some embodiments, various aspects, features, and/or functionalities of the MMMS System may be performed, implemented and/or initiated by one or more of the various systems, components, systems, devices, procedures, processes, etc., described and/or referenced herein.

In at least one embodiment, a given instance of the MMMS System may access and/or utilize information from one or more associated databases. In at least one embodiment, at least a portion of the database information may be accessed via communication with one or more local and/or remote memory devices. Examples of different types of data which may be accessed by the MMMS System may include, but are not limited to, one or more of those described and/or referenced herein.

According to different embodiments, various different types of encryption/decryption techniques may be used to facilitate secure communications between devices in MMMS System(s) and/or MMMS Network(s). Examples of the various types of security techniques which may be used may include, but are not limited to, one or more of the following (or combinations thereof): random number generators, SHA-1 (Secured Hashing Algorithm), MD2, MD5, DES (Digital Encryption Standard), 3DES (Triple DES), RC4 (Rivest Cipher), ARC4 (related to RC4), TKIP (Temporal Key Integrity Protocol, uses RC4), AES (Advanced Encryption Standard), RSA, DSA, DH, NTRU, and ECC (elliptic curve cryptography), PKA (Private Key Authentication), Device-Unique Secret Key and other cryptographic key data, SSL, etc. Other security features contemplated may include use of well known hardware-based and/or software-based security components, and/or any other known or yet to be devised security and/or hardware and encryption/decryption processes implemented in hardware and/or software.

According to different embodiments, one or more different threads or instances of the MMMS System may be initiated in response to detection of one or more conditions or events satisfying one or more different types of minimum threshold criteria for triggering initiation of at least one instance of the MMMS System. Various examples of conditions or events which may trigger initiation and/or implementation of one or more different threads or instances of the MMMS System may include, but are not limited to, one or more of those described and/or referenced herein.

It will be appreciated that the MMMS System of FIG. 1 is but one example from a wide range of MMMS System embodiments which may be implemented. Other embodiments of the MMMS System (not shown) may include additional, fewer and/or different components/features that those illustrated in the example MMMS System embodiment of FIG. 1.

Generally, the MMMS techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the MMMS techniques described herein may be implemented on a general-purpose programmable machine selectively activated or reconfigured by a computer program stored in memory. Such programmable machine may include, for example, mobile or handheld computing systems, PDA, smart phones, notebook computers, tablets, netbooks, desktop computing systems, server systems, cloud computing systems, network devices, etc.

Figure 2:
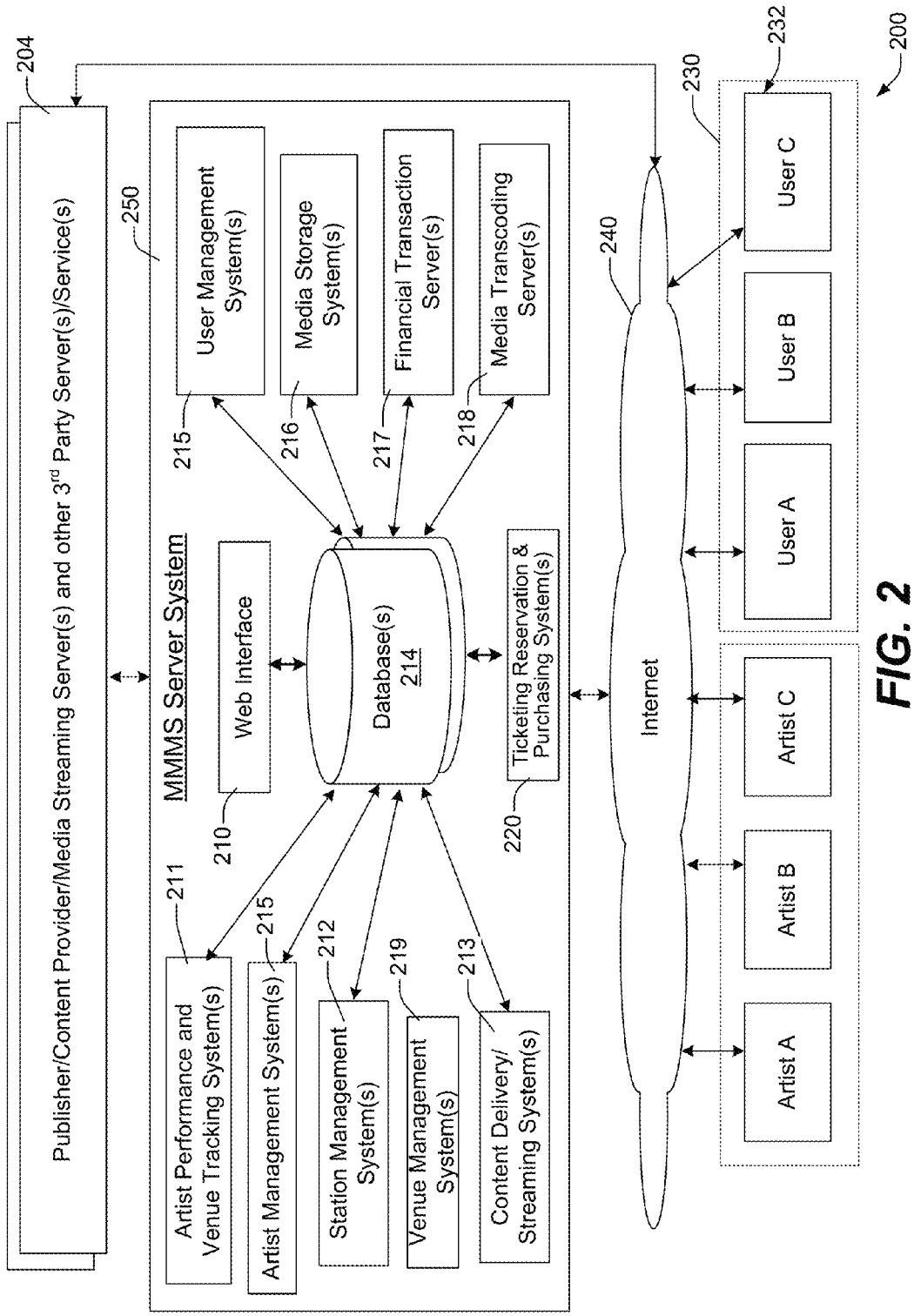
FIG. 2 shows a specific example embodiment of a network diagram illustrating an embodiment of an MMMS System 200.

FIG. 2 shows a specific example embodiment of a network diagram illustrating an embodiment of an MMMS System 200, which may be configured or designed for implementing various aspects, functions, and/or features such as one or more of those described and/or referenced herein. Additionally, the example embodiment of FIG. 2 provides an illustrative example of the different interactions and communication paths between and among the various components of the MMMS System network.

According to specific embodiments, the MMMS System may be accessible to various entities such as, for example: individual persons, corporate or business entities, system administrators, online content providers, online publishers, merchants, artists, copyright holders, etc.

In at least one embodiment, the MMMS System may include a plurality of hardware and/or software components operable to perform and/or implement various types of functions, operations, actions, and/or other features of the MMMS technology disclosed herein. Examples of such components may include, but are not limited to, one or more of the following (or combinations thereof):

MMMS Server System (e.g. 250).
Artist Performance and Venue Tracking System(s) 211, which, for example, may be configured or designed to facilitate, initiate and/or perform one or more of the following operation(s)/action(s) (or combinations thereof):
Manage database(s) of Event information.
Information about Events may be stored or cached, include artist(s), date(s) and venue(s), geographic location(s), photographs along with ticketing information, as well as additional fields.
Venue and Event data may be incorporated from external sources, using external API as available and permitted.
Accommodate discrepancies between internal and external databases and data.
Artist Management System(s) 215, which, for example, may be configured or designed to facilitate, initiate and/or perform one or more of the following operation(s)/action(s) (or combinations thereof):
Provide interfaces to, and manage database(s) for the purpose of storing, editing and distributing media and material relating to the Artist's identity, including but not limited to Albums, Tracks, Photographs, Video Links, Biographies, Tags, Locations, Comments, Reviews, Social Networks and Hyperlinks.
Once authenticated, Artists may easily edit their own information, and access statistics and analytics associated with their account from a central dashboard.
Artists may view the statistics and activities of their Stations, Tracks, Albums, email subscribers, and Radio Play.
Station Management System(s) 212, which, for example, may be configured or designed to facilitate, initiate and/or perform one or more of the following operation(s)/action(s) (or combinations thereof):
Store and cache 'Stations' of two types: Static and Dynamic.
Static Stations may include a ranked list of Artists, with no minimum or maximum number.
Dynamic Stations may include a "snapshot" of Filter Settings used when the Station was created or saved. At any point in time the Station may be refreshed, resulting in a new Ranked List of Artists recalculated from the most current MMMS databases, according to the Saved Filters.
MMMS may store or cache usage statistics and listenership data for one or more Stations
Content Delivery/Streaming System(s) 213, which, for example, may be configured or designed to facilitate, initiate and/or perform one or more of the following operation(s)/action(s) (or combinations thereof): Serve digital content, including, but not limited to audio, video, images, or other documents to a variety of network enabled devices, including, but not limited to, desktop and laptop computers, PDAs, smart phones, tablets, iOS devices, or other external networks.
User Management System(s) 215, which, for example, may be configured or designed to facilitate, initiate and/or perform one or more of the following operation(s)/action(s) (or combinations thereof): Store information and usage statistics for several classes of User, including Visitors, Users, Artists, Venues, and Administrators
Media Storage System(s) 216, which, for example, may be configured or designed to facilitate, initiate and/or perform one or more of the following operation(s)/action(s) (or combinations thereof): Employ sufficient and reliable digital storage, as is necessary to hold Artist Content in an organized fashion.
Financial Transaction Server(s) 217, which, for example, may be configured or designed to facilitate, initiate and/or perform one or more of the following operation(s)/action(s) (or combinations thereof): Provide servers or services related to the processing of financial transactions, through a variety of methods.
Media Transcoding Server(s) 218, which, for example, may be configured or designed to facilitate, initiate and/or perform one or more of the following operation(s)/action(s) (or combinations thereof): Receive digital audio content from Artists, and performing any operations that are necessary for operation of the MMMS system, and related subsystems.
Venue Management System(s) 219, which, for example, may be configured or designed to facilitate, initiate and/or perform one or more of the following operation(s)/action(s) (or combinations thereof): Provide interfaces to, and manage database(s) for the purpose of storing, editing and distributing media and material relating to the identity of a Venue, including but not limited to Calendar Information, Photographs, Video Links, Descriptions, Tags, Locations, Social Networks and Website. Once authenticated, Venues may easily edit their own information, and access statistics and analytics associated with their account from a central dashboard.
Ticketing Reservation and Purchasing System(s) (TRPS) 220, which, for example, may be configured or designed to facilitate, initiate and/or perform activities/operations relating to reservation and/or purchasing of tickets to events such as live performances at one or more venues.

According to different embodiments, at least some MMMS System(s) may be configured, designed, and/or operable to provide a number of different advantages and/or benefits and/or may be operable to initiate, and/or enable various different types of operations, functionalities, and/or features, such as, for example, one or more of the following (or combinations thereof):

"Shows Near" Geographic Location Stations Functionality
In at least one embodiment, MMMS System (also referred to herein as "DeliRadio") users may create geographic location specific (e.g., "city specific") streaming radio stations playing artists with upcoming live performances within the geographic location (e.g., San Francisco) specified by the user. Additionally, users may specify other filtering criteria (either separately or in different combinations) such as, for example, one or more of the following (or combinations thereof):

Geographic proximity or "radius" filtering criteria (e.g. "within 15 miles of Paris" or "within 50 miles of Chicago");

Time/Date filtering criteria (e.g. "tonight," "this week," "next 2 weeks," "all dates" or "custom dates" wherein a user specifies a specific date range such as between July $15^{th}$ and August $3^{rd}$);

"Genre" and/or "Tag" filtering criteria (e.g. folk, folk+rock, folk+rock but not experimental)

Venue specific filtering criteria (e.g., limit search results to events at The Fillmore (San Francisco) or The Great American Music Hall (San Francisco) or Yoshi's Jazz Club (Oakland)).

Artist/band specific filtering criteria (e.g., "The Cribs"; "STS9 or Mojomama"; etc.) In at least one embodiment, when a user enters their filter criteria for a "Shows Near" Geographic Location search, DeliRadio searches its database (and/or remote database(s)) and automatically and dynamically generates (e.g., in real-time) at least one streaming radio station which will play only songs from artists who match the criteria. For example, "Folk Rock but not Experimental Artists with upcoming live performances in the next 2 weeks within 50 miles of Chicago."

Venue(s) Stations Functionality

In at least one embodiment, DeliRadio users may create "venue specific" streaming radio stations playing artists with upcoming live performances at one or more venues selected by the user. Users may also set "timeframe" filter criteria (e.g. "tonight," "this week," "next 2 weeks," "all dates" or "custom dates" wherein a user specifies a specific date range such as between July $15^{th}$ and August $3^{rd}$). Users may also set "genre" filter criteria (e.g. "folk," or "folk+rock," or "folk+rock but not experimental"). When a user enters their filter criteria for a Venue(s) Station, DeliRadio searches its database (and/or remote database(s)) and automatically and dynamically generates (e.g., in real-time) at least one streaming radio station playing only songs from artists who match the specified filter criteria. For example, using one or more DeliRadio GUIs, a user may initiate a filtered search for "Folk Rock but not Experimental Artists with upcoming live performances at The Fillmore, Great American Music Hall and Café Du Nord between July $15^{th}$ and August $3^{rd}$." In response, DeliRadio may search its database (and/or remote database(s)) and automatically and dynamically identify and display (e.g., in real-time) information relating to artists/bands and/or upcoming live performances which match the user specified filter criteria. Additionally, DeliRadio may identify songs of artists/bands which match the user specified filter criteria, and dynamically generate a streaming radio station which includes only songs from the identified artists who match the user specified filter criteria.

Hometown/Neighborhood Stations Functionality

In at least one embodiment, DeliRadio users may create "artist hometown/neighborhood" streaming radio stations which includes only those artists whose hometown or "home-hood" matches a city or neighborhood specified by the user. Users may also specify geographic proximity (e.g., "radius") filter criteria (e.g. "within 15 miles of Paris" or "within 50 miles of Chicago"); and/or may also specify "genre" filter criteria (e.g. "folk," or "folk+rock," or "folk+rock but not experimental"). When a user enters their filter criteria for a Hometown/Homehood Station, DeliRadio searches its database (and/or remote database(s)) and automatically and dynamically generates (e.g., in real-time) at least one streaming radio station for playing only songs by artists who match the criteria. For example, "Folk Rock but not Experimental Artists from within 5 miles of Moscow" or "Indie Singer-Songwriter but not Country Artists from the Lower East Side of New York City."

Artist/Show Recommendation Stations Functionality

In at least one embodiment, DeliRadio users may enter the name of one or more artist(s)/band(s) (herein the "Target Artist(s)") to create "recommendation" stations, where the "recommendation criteria" for the station is based primarily on live performance and tour information, such as, for example, one or more of the following (or combinations thereof):

(1) other artists who have performed with the Target Artist(s) in the past;

(2) other artists who are scheduled to perform with the Target Artist(s) in the future;

(3) other artists who have performed at the same venue(s) and/or festival(s) that the Target Artist(s) has performed at in the past; and/or (4) other artists who are scheduled to perform in the future at the same venue(s) and/or festival(s) that the Target Artist(s) has performed at.

Additional "recommendation criteria" may include other filter criteria such as, for example, one or more of the following (or combinations thereof): other artists who have been "starred" by DeliRadio users who have also starred the Target Artist(s); genre and tag cross-matching filter criteria (e.g., specified by the user); play count and popularity within the DeliRadio System; geolocation based criteria (such as prioritizing other artists in the station based on upcoming concerts that are proximal to the listener); "similar artist" results which, for example, may be acquired from API calls to external databases (e.g. EchoNest, Last.FM); user created stations that include one or more of the Target Artist(s); etc.

Ticket Reservation Service Functionality

Venue Implementation: In at least one embodiment, the MMMS System may be configured or designed to provide ticketing reservation and purchasing functionality for enabling and/or facilitating users in performing activities/operations relating to reservation and/or purchasing of tickets to events such as live performances at one or more venues. For example, in at least one embodiment, the MMMS System may include a Ticketing Reservation/Purchase System ("TRPS") which may be configured or designed to automatically and/or dynamically identify event ticketing reservation/purchasing opportunities in advance of tickets going on sale to the public. In one embodiment, reservation and/or purchasing of tickets by DeliRadio users may be facilitated by $3^{rd}$ party system(s)/component(s). In at least one embodiment, at some point after the Initial Ticket On-Sale event (e.g., approximately 1-5 days after), the venue hosting the event (e.g., concert/show) would set the Reservation Allotment for how many reservations it would guarantee/allot for a specific concert. In one embodiment, to determine the Reservation Allotment, the venue may take their "Sellable Capacity" less "Anticipated Sales", and the remaining number may be the Anticipated Unsold Tickets ("AUTs"). For example, a venue with a Sellable Capacity of 500 and Anticipated Sales of 300 would have 200 AUTs remaining The TRPS would multiply the venue's AUT by a "super percent" multiplier (e.g., 100+%), thus creating the Reservation Allotment for the event. One reason for the super percentage multiplier is that not all reservations may be converted to a ticket purchase.

Customer Interaction: In at least one embodiment, once the Reservation Allotment is available in the TRPS, DeliRadio users may be able to view a Concert Page for a particular event. On the Concert Page, the user may view (e.g., in real-time) information relating to the total number of tickets sold for that event and the number of reservations available. DeliRadio users may be able to "buy now" for immediate ticket purchase and/or be able to make ticket reservations (e.g., for one or more persons). In one embodiment where DeliRadio users may "star" particular venues, DeliRadio users could receive an update when an event is scheduled at one of their starred venues, and by clicking on the update, they may be directed to the Concert Page for that event, where they could purchase tickets and/or make Reservations.

Making the Reservation: In at least one embodiment, when making the Reservation, the Reservation Host may be able to designate other DeliRadio users (Reservation Recipients) to receive an "invitation to accept the Reservation." This message may be sent within DeliRadio to Reservation Recipients. The Host and the Recipients would have a window of time in which to convert their Reservations into Ticket purchases. Once the Host has received confirmation from Recipients of their intent to attend the show as a group (e.g., via DeliRadio SMS, text message, phone call, in person, etc.), the Reservation Host may automatically handle the Ticket purchases on behalf of the Reservation Group.

Picking up Tickets purchased through TRPS: In at least one embodiment, the venue keeps track of tickets purchased through at least one Reservation Group in the TRPS. The Host of at least one Reservation Group is now "hosting" a "guest list" of attendees at the event. At least one member of the Reservation Group arrives at the venue, informs Will Call that they're on the Reservation Host's Guest List, presents ID, and receives their Ticket.

Reservation Incentives: In at least one embodiment, venues participating in the TRPS may be able to access their Venue Dashboard, select a particular event, and set any incentives/discounts it wants to offer for that event. The Reservation Host would then be eligible for deals as an incentive for buying AUTs in bulk, for example. In at least one embodiment, DeliRadio users who reserve or purchase their tickets via the DeliRadio System may receive other types of promotional offers or benefits such as, for example:

Bulk Ticket Discount: By way of example, 5 tickets for the price of 4, with the discount spread across the price of one or more tickets, thus benefiting the Reservation Group. The venue is only getting income from 4 ticket sales, but the event will be attended by 5 persons who may generate other income for the venue while attending the show.

Promotional Offers: drink tickets, venue swag, VIP privileges, priority seat reservations, discount coupons, etc.

Future Show Discounts: Discounts on Ticket purchases for future shows at that venue, or at shows among various venues in a Venue Group.

Vendor Affiliate Discounts: Discounts at vendors/merchants in the same neighborhood as the venue.

Venue "Points": Redeemable by the Host at the venue at some later date for any of the above.

TRPS Monetization: Monetization of the TRPS could take one or more of the following forms (or combinations thereof): Per Ticket Fee; Per Order Fee; and/or Per Show Fee.

Example Models for Sponsorship Sales: (1) local/national sponsor underwrites one or more fees and is perceived as paying one or more convenience fees related to Tickets purchased through the TRPS for that event, in exchange for brand goodwill and/or user data provided by DeliRadio; (2) local/national sponsor pays a flat fee per show to buy a relationship with a specific demographic and receives demographic specific user data from DeliRadio; (3) local/national sponsor pays a flat fee per show and offers product giveaways and/or raffle entries for a contest.

Example "Reservation" Definitions: (1) a socially broadcast interest in attending a particular event (e.g., a "like" for an event that others may see), and then helping that general interest culminate in a tipping point where everyone wants to convert their Reservation into Ticket Buys to be guaranteed admission; (2) an option to purchase a Ticket; (3) an opportunity for an individual to get a group of people to buy multiple tickets, and by doing so, the organizer (host) receives something of value from the venue; (4) a discrete unit of the allocation of Anticipated Unsold Tickets multiplied by a super-percentage (100+%)

According to different embodiments, a reservation window may close the sooner of (1) x days before the event or (2) X % of Tickets sold. Alternatively, X days after the Reservation is made, but no later than X days before the event.

Example Benefits/Advantages of MMMS System TRPS: Various benefits/advantages of the MMMS System TRPS may include, for example: the limited quantity of Reservations; the limited time window in which to convert Reservations into Ticket Buys; and/or the social broadcast nature of the Reservation (allowing one or more DeliRadio users to see the status of one or more Reservations for a given show at any time.

Functionality for Display of Relevant Gigs on a Per-User Geo-Location Basis

In at least one embodiment, when a DeliRadio station is created, information relating to the station may be displayed or presented to the user via a Pop-Out Player GUI which may include one or more of the following types of content and/or features (or combinations thereof):

Venue Station: if the station created is venue-specific, then the first concert date displayed for at least one artist in that station matches the concert scheduled to occur at the venue(s) selected in the user's search criteria.

Geographic proximity: if the station created is not venue-specific, and an artist in the station has an upcoming concert within a predetermined radius (e.g., 200 miles) of user's location (as determined by geo-locating the user's IP address or user's mobile device, for example), then that concert within 200 miles of the user is the first displayed concert.

Chronologically: if the station created is not venue-specific, and an artist in the station does not have an upcoming concert within the predetermined radius (e.g., 200 miles) of user's location (e.g., as determined by geo-located the user's IP Address or user's mobile device), then the concert that is occurring next chronologically is the first displayed concert.

Stations Map Overlay Functionality

In at least one embodiment, information relating to any given station created on DeliRadio may be selectively displayed according to the user's viewing preferences, such as, for example: "List View" (e.g., FIG. 11), "Tile View" (e.g., FIG. 12) or "Map View" (e.g., FIG. 13). In one embodiment, when a genre and/or hometown station is viewed in map view, at least one artist's hometown is plotted on a map (e.g., using "guitar pick" icons to indicate the location(s) on the displayed map), and a number inside the guitar pick indicating how many artists matching the search reside in that location (see, e.g., FIG. 13). When a DeliRadio Station for "shows near" city/neighborhood or one or more venues is created, the guitar pick icons indicate venue locations where a concert that matches the search criteria may take place, and the number inside the guitar pick indicate how many artists matching the search may perform at that venue. In either instance (hometown/genre stations or "shows near" city/venue stations), clicking on a displayed icon may open a small window listing the artists matching the overall search criteria who are located (or who have upcoming concerts located) in or near the location indicated by the corresponding selected icon. In at least one embodiment, each of the List View, Tile View, and Map View GUIs may also include a "Play Station" button which enables a user to create a new station which is automatically configured to play only songs from the artists displayed in the current window/GUI (and, in some embodiments, related artists as well).

For example, creating a DeliRadio Station of rock bands (without indicating a specific location) may include all rock bands on DeliRadio. The map view may initially only display rock bands within a certain radius of the user's IP Address or user's mobile device. The user may then zoom out to see one or more DeliRadio rock bands across the world, as indicated by guitar picks for at least one location. Clicking on a guitar pick over London, England, may reload the map view to focus only on London. Clicking on the guitar pick over London may open a window listing one or more the London rock bands. The user may then click the play button to hear only rock bands from London. This same example could be used for a "hometown" only station (e.g., indicating a search for one or more bands from a specific city or town) or a hybrid hometown/genre station (e.g., indicating a search for one or more bands of a specific genre (or genres) from a specific city or town).

For example, creating a DeliRadio Station of rock bands with upcoming shows within 100 miles of Amsterdam, Netherlands, when viewed in map view, may display one or more DeliRadio rock bands with upcoming shows in this radius around Amsterdam. In one embodiment, at least a portion of the displayed icons on the map may represent or indicate venues where one or more of the show(s) (matching the filtered search criteria) are to take place. In at least one embodiment, one or more displayed icons may each display a numerical value indicating the number of upcoming shows at that particular venue for which ticket reservations/purchases are currently available. In one embodiment, clicking on an icon may cause a Venue Info GUI to be displayed which includes information about one or more bands matching the search criteria at that particular venue. In one embodiment, a user may click a "Play" button displayed in the Venue Info GUI to dynamically generate a DeliRadio Station playing only those bands at that venue.

Gig Sharing (User-to-User) Functionality

In at least one embodiment, a user may select a particular concert/event from an artist's upcoming calendar, and share the event information (e.g., date, artists performing, location, ticket price, ticket purchase information, etc.) as well as content associated with the performing artists (e.g., audio recordings, photos, biographical information, website links, Facebook URLs, Twitter URLs, etc.) directly with other DeliRadio users (e.g., via DeliRadio's DeliRadio Mobile Applications and web applications), and associate a personal message from the sharer with the information shared. This would present an opportunity for the "sharer" and the "sharee(s)" to express their interest in attending the show together, whether by making plans offline or purchasing tickets online, including via the DeliRadio Ticket Reservation Service.

Social Blogging Functionality

By embedding the DeliRadio BloggerTool javascript in the <head> of their HTML pages, website operators may use DeliRadio to provide playable links next to the textual mention of any Artist Name that currently has music available for public streaming on DeliRadio. Clicking on a play link may launch the DeliRadio Pop-Out Player that may either play the single artist that was clicked on, or a DeliRadio Station comprising one or more artists (including the selected artist) with DeliRadio music on that web page. A single web page may include multiple instances of the DeliRadio BloggerTool.

Play Traction Heat Map Functionality

In at least one embodiment, artists may view an interactive world map overlaid with "heat zones" indicating where and to what degree listeners have been streaming that artist's music. Artists may interact with a Play Traction Heat Map GUI to change views and/or filter criteria to view mobile plays, website plays, or both combined. In at least one embodiment, the Play Traction Heat Map Functionality may also be operable to enable the artist to further hone this map to a specific album or track.

Artist/Band Tweet @ Functionality

In at least one embodiment, if an artist has provided their Twitter handle in their DeliRadio artist profile, then, when a DeliRadio listener is streaming an artist's recording on the DeliRadio Mobile Application, with 1-click the user may send a Twitter message ("tweet") directly at the artist's Twitter handle, with an automatically generated (or personalized) comment and a link to the artist's DeliRadio station. Any Twitter user who "follows" the DeliRadio user sending the tweet, who follows the artist on Twitter or who follows DeliRadio on Twitter may see the tweet in their "feed." Any Twitter user who clicks on the link for the artist's station may view the artist's upcoming concert dates. In one embodiment, the first date displayed may be presented per the algorithm described in the "Display of Relevant Gigs on a Per User Geo-Location Basis" section.

Auto-Magic Blog Functionality

In at least one embodiment, any DeliRadio City/Neighborhood/Venue "Shows Near" or "Bands From" station may include a more comprehensive display of related content via that station's own unique, automatically updating website (or GUI or webpage). The station's own unique, automated content updating website may be referred to as the "AutoMagic Blog." In one embodiment of the AutoMagic Blog, the DeliRadio user responsible for owning or managing the station/blog would receive their own unique Twitter handle for that station/blog (e.g. @drfm_oakland). Information and/or other content which may be displayed at the AutoMagic Blog may include, but are not limited to, one or more of the following (or combinations thereof):

A map showing the specified radius for the station;

The station's venue and/or artist search results overlaid on that map, with associated playable links;

The station's search results of artists and concerts presented in list form;

Artist profiles of at least one artist in the search results;

A DeliRadio embedded player which plays the search results for that station;

A customized "outgoing" twitter feed of one or more tweets from the blog's owner;

A customized "incoming" twitter feed representing a real time search of one or more tweets by twitter users who include in their tweet a hashtag for the blog (e.g. #drfm_oakland). In at least one embodiment, the Blog's owner could "re-tweet" (e.g., from the owner's official Blog handle) any tweets containing the hashtag, thus creating a method for Twitter users to tweet comments and a method for the Blog owner to officially recognize those comments by retweeting them;

A "PLAY" button for the outgoing Twitter feed that uses technology to "scrape" any DeliRadio station links, allowing at least one tweet to be played as a DeliRadio Station, or one or more tweets in the feed to be played as a separate station;

A "PLAY" button for the incoming Twitter feed that uses technology to scrape any DeliRadio station links, allowing at least one tweet to be played as a DeliRadio Station, or one or more tweets in the feed to be played as a separate station;

Editorial content related to the artists and venues currently displayed, either linked in from outside websites or created within the Blog itself by the Blog owner;

Etc.

Track-Level Control Slider Functionality

In at least one embodiment, when an artist uploads audio recordings to DeliRadio, the "Track-Level Control Slider" gives them fine-grain control over how their recordings are made available and promoted across the internet, based on a "promotional sliding scale" that increases by degree of public availability. In at least one embodiment, the Track-Level Control Slider GUI may be configured or designed to enable a user to assign one or more separately definable access and/or usage attributes to each of the Artist's recordings (e.g., which have been uploaded to the DeliRadio System). Examples of such access and/or usage control attributes may include, but are not limited to, one or more of the following (or combinations thereof):

For Sale Only: Tracks marked as "for sale only" are not streamable anywhere on DeliRadio, but downloads may be purchased on the artist's DeliRadio profile page by listeners.

Profile Only: Tracks marked as "profile only" are streamable only on the artist's DeliRadio profile page via the Pop-Out Player (which may also be embedded elsewhere on the internet), but these tracks may not be included in the pool of tracks available for stations created by DeliRadio users and stations automatically generated by DeliRadio.

Radio Enabled: Tracks marked as "radio enabled" may be streamable on the artist's DeliRadio profile page via the Pop-Out Player, and may also be included in the pool of tracks available for stations created by DeliRadio users and automatically generated by DeliRadio.

Radio Preferred: Same as Radio Enabled, but "Radio Preferred" tracks may be played first when this artist appears in a DeliRadio station.

Free Download: This checkbox may be applied to any track, and may allow the free, promotional download of the marked track. Free downloads are only available on the artist's DeliRadio profile page.

Functionality for Targeted Promotion of Stations on the DeliRadio Website, Based on User Location In at least one embodiment, the DeliRadio homepage may be comprised in part of a "mosaic" of image "tiles", wherein each tile may depict a DeliRadio station selected for promotion on the homepage, including but not limited to one or more of the following (or combinations thereof): festival stations, venue stations, record label stations, artist stations, etc. These promotional mosaic tiles may be "tagged" in the DeliRadio System as being associated with a specific geographic region or regions. For example, a festival taking place in New York may be tagged as being associated with the eastern coast of the United States. When a user arrives at the DeliRadio homepage, the user may be geo-located based on their IP Address or user's mobile device, and the DeliRadio homepage promotional mosaic tiles may be automatically and dynamically selected (e.g., in real-time) based on that user's location, such that the promotional mosaic tiles the user sees on the homepage may be directly geo-targeted to each individual user. For example, the DeliRadio System may determine a first user's geolocation as being Paris, France, and in response, the DeliRadio System may display to the user only promotional mosaic tiles associated with the geographic region(s) in and around Paris. In contrast, the DeliRadio System may determine a second user's geolocation as being San Francisco, Calif., and may display to the second user only promotional mosaic tiles associated with the geographic region(s) in and around San Francisco, Calif.

Share a Gig Functionality

Compatible with the conventional ways to share content between users and among existing social networks (e.g., Facebook, Twitter, etc.), a DeliRadio user may select a particular show or event from an artist's upcoming tour calendar, and share that show/event via the DeliRadio mobile and web apps. This would mark a user's interest in that particular show, which may be visible to other users of the DeliRadio System, and may present an opportunity to other DeliRadio users to express their interest in the identified show/event.

Venue Check-In Functionality

In at least one embodiment, mobile device users may use the DeliRadio Mobile Application to "Check-In" at a show or event. For example, in one embodiment, by accessing one or more databases relating to events, shows, and/or tour dates (e.g., including, for example, DeliRadio tour date archive database), and using the geolocation services/functionality at the user's mobile device (at least a portion of which may be provided by the DeliRadio Mobile Application), the venue check-in process may be streamlined considerably as compared to more traditional methods of check-in. In at least one embodiment, the DeliRadio Mobile Application may be configured or designed to include functionality for facilitating user "Check-In" activities at a given venue & event. After completing a check-in activity at a given location, the user may be granted (e.g., via the DeliRadio Mobile Application and/or DeliRadio website) access to additional functionality, promotional opportunities, and/or rewards, such as, for example, one or more of the following (or combinations thereof):

Join the venue email list;

Vote for upcoming shows (e.g., at that venue);

Access current band's info, twitter, Facebook, merchandise and email list signups;

Incentives for discounted drinks and/or merchandise;

receive information or notification about friends or other DeliRadio users who will be attending one or more show(s) at the venue and/or who have already check-in at the venue for the current show;

Send photos to band and/or DeliRadio Band/Artist webpage or blog;

Integrate with additional "check-in" services;

Earn points for social activity which may be later redeemed by the user for promotional rewards, incentives, etc.

Embedded Players and Extended Functionality

In at least one embodiment, the DeliRadio System technology disclosed herein provides capability for any DeliRadio Station, Album, or Artist to be embedded in any webpage on the World Wide Web, using an <iframe> tag and HTML5 code, for example. The user may customize the appearance of the embedded player prior to receiving the code. The user may customize: color scheme & width of the player, along with choosing the visibility of tour dates, photos, & station title. In one embodiment, when an embedded player is first loaded, it will cycle through the artists in the station in a random order, displaying one highlighted gig according to certain criteria. This first displayed tour date is chosen with regards to the 'closest upcoming show' in geographic proximity, based on the geolocation of the user (e.g., via user's IP address or via geolocation of users mobile device). If a DeliRadio Station has been created based on specific 'Venue Criteria', the highlighted date(s) will be the upcoming date(s) that occurs at one of the specified venue(s).

In some embodiments, the Embedded Players and Extended Functionality may include the ability for a venue to embed a complete concert calendar which may include listings for bands that aren't currently members of DeliRadio and/or which may include bands which are not currently in the DeliRadio database. Concert calendars may be accompanied by additional GUI features/buttons in the embedded window for enabling features such as, for example, one or more of the following (or combinations thereof): genre and date range selectors, multiple stages or associated venues, social sharing tools, etc.

In at least one embodiment, Track and Album embeds may be accompanied by corresponding track list(s), with additional GUI features/buttons in the embedded window for enabling features such as, for example, one or more of the following (or combinations thereof): downloading the tracks, social sharing tools, favoriting/liking/following controls, purchase options, links to external sites for purchase/download, etc.

In one embodiment, a user may choose to customize and embed a button (e.g., via a <script> tag) that creates a button on an external web page that immediately triggers a pop-up window containing just the DeliRadio player for that Station, Artist or Track. The Embedded Players and Extended Functionality may include is functionality for the embedded player to cycle through the photos of bands in the embedded station, even if the visitor to the website where the player is embedded has not tapped or clicked on the "PLAY" button. In at least one embodiment, this may result in the display of an automatically and/or dynamically generated "slideshow" of images of the artist(s) associated with that particular station.

Examples

The following examples are intended to help illustrate some of the various types of functions, operations, actions, and/or other features which may be provided by the MMMS System. By way of example, described below are some examples of "Stations" that may be created, named, saved, shared and listened to in real-time via the MMMS System, by adjusting the intuitive filters that appear in the various GUIs presented by the MMMS System.

(1) a DeliRadio Station Comprised of Songs by Indie Rock Bands (or any Other Genre) that are Playing Shows within 10 Miles San Francisco this Saturday Night.

While the collection of songs is being streamed to the user's computer or mobile device, a photo slide-show of the current Artist is simultaneously streamed and rotated on the listeners browser or mobile device.

Date and location of upcoming show nearby is displayed next to current Artist and track information.

In many urban areas, fans have the opportunity to see dozens of shows on any given night. By creating this station, they may be able to hear a selection of songs relating only to those Artists who have been identified as playing upcoming shows within 10 miles San Francisco within the specified time period.

Stations may be shared with friends on Facebook, twitter or any other social media sites, instantly.

(2) a DeliRadio Station Comprised of Bands from a High School, College, Hometown, or any Other Geographical Grouping.

In at least one embodiment, the MMMS System may include functionality for enabling the user to post a link to a selected DeliRadio Station on Facebook or social networks. From there, one or more the user's friends may view the post/link, and may instantly listen to the DeliRadio Station by clicking on the link (for example). In at least one embodiment, the user's social networking friends and/or other DeliRadio users may be able to chat with the user (or with others) via a chat GUI which may be incorporated into the associated DeliRadio Station web page. According to different embodiments, DeliRadio Station chat functionality may be selectively enabled and/or disabled by the creator/owner of that DeliRadio Station.

(3) a DeliRadio Station Comprised of Choir Music from Choirs Based in and Around Oakland, Calif.

Very many choir groups exist nationwide, and most of them make recordings which are difficult to promote and share publically.

A DeliRadio 'Oakland Choir Radio' Station may be dynamically created by the MMMS System and could be made to be publically accessible a variety of different groups such as, for example, one or more of the following (or combinations thereof): users/members of the MMMS System; social network friends and family; anyone who is able to obtain the URL to the DeliRadio Oakland Choir Radio Station (e.g., by doing a Google search, for example).

(4) a DeliRadio Station Comprised of California High School Bands that Rank in the Top 100 "Most Popular", "Most Listened to", Etc.

Rankings may be generated and/or updated manually, automatically, and/or programmatically via data gathered from statistics and analytics relating to artist and user actions, such as 'track play count', 'page views', 'MMMS player spins', most starred, 'band preferred', upcoming tour dates, etc.

(5) a DeliRadio Station of US Serviceman Rock Bands (Stationed Anywhere in the World.)

Could be active members only, or active and retired.

Could be genre agnostic; for instance, it could be rap-specific, reggae, etc.

Example DeliRadio Station: One or more 'Southern Rock' groups, currently stationed in Iraq.

(6) a DeliRadio Station Comprised of Bands Made Up of Workers at Safeway Supermarkets Once a DeliRadio Safeway Station was created, bands that want to be included in this station may send requests to the station owner asking to be added.

Stations may be earmarked as "closed" or "open" to non-owner manipulation of content.

Corporations could find this a healthy morale building enterprise, and could even promote it actively as such.

(7) a DeliRadio Station Comprised of Bands Playing Upcoming Shows at a SPECIFIC VENUE.

A lot of music fans have a favorite venue(s).

The songs and artists associated with the Station may be automatically, dynamically and/or periodically updated so that it may be kept current with the upcoming events, shows, artists, song popularity, etc.

Venues could post links to their DeliRadio Station on their web sites, and send links to their DeliRadio Station out to recipients on the venue mailing list.

In at least one embodiment, the content streamed by the DeliRadio Venue Station may automatically and periodically be updated (e.g., "Always Be Current"). In one embodiment, the Station owner (e.g., which may be the venue's agent) may manually update DeliRadio's database of upcoming shows and events that particular venue. In other embodiments, the MMMS System may automatically and periodically access updated venue-specific event/date/artist information from one or more remote databases and APIs such as, for example, those provided by, Songkick, Last FM, etc.

One significant advantage/benefit of the customized DeliRadio Venue Station is that it facilitates and provides the ability for end users and customers to easily access, learn about, explore, and listen to music from bands/artists who will be performing (and/or who have performed) at a given venue. Venues may advantageously leverage the features and advantages by embedding their customized, venue-specific DeliRadio Station in the home page (or other web pages) of the venue's website.

Another significant advantage/benefit customized DeliRadio Venue Station is that it allows the venue to offload the tasks of managing, uploading, and updating the venue's website with new music relating to the artists of upcoming shows. For example, in one embodiment, when the venue books an upcoming show with a given artist, the venue may simply instruct the artist to upload one or more of the artist's song(s) and/or album(s) to the DeliRadio System.

In at least one embodiment, the DeliRadio System may include functionality for automatically monitoring newly uploaded content, and cross checking the identified content with other resources in order to automatically link selected portions of the newly uploaded content with selected DeliRadio Stations.

In at least one embodiment, the MMMS System may be configured or designed to automatically identify various types of criteria (e.g., song, artist, album, video, venue, user location, artist location, etc.) relating to content being displayed to a user as the user accesses the DeliRadio website and/or DeliRadio Mobile Application.

In at least one embodiment, one or more GUIs may be displayed to the user to facilitate operation and/or initiation of the various features and functions disclosed herein. According to different embodiments, the GUIs may be implemented via use of a web browser application, a mobile device application, a desktop application, a cloud-based service, etc. In at least one embodiment, a User Web Interface may provide functionality for dynamically generating at least a portion of the GUIs.

As illustrated in the example embodiment of FIG. 2, the MMMS System may include one or more databases (e.g. 240, FIG. 2), which, for example, may be populated with information and/or content relating to music, videos, venues, events, merchants, merchandise, artists, user profile information, user activity information, radio station information, etc.

In at least one embodiment, one or more of the databases may be queried via the use of various types of programming languages and/or protocols such as, for example, one or more of the following (or combinations thereof): HTML, XML, MySQL, Perl, Ajax, JavaScript, Etc.

In at least one embodiment, a user may initiate a MMMS session via the Internet (e.g., via 240, FIG. 2) to cause the MMMS System to perform and/or initiate various functions and operations (such as those described and/or referenced herein), according to user-specified criteria.

In at least one embodiment, the MMMS System may be operable to populate and/or access information at Database(s) 214, and utilize such information in order to identify and/or determine artist information and/or music content according to user-specified criteria. Examples of such database information may include, but are not limited to, one or more of the following (or combinations thereof):

artist profile criteria, including, but not limited to artist rating, artist feedback, etc.;

artist location information;

music genre information;

venue information;

artist event performance information and related venue information;

ticketing information;

geographical information relating to artists, events, venues, users, etc.

calendar information relating to artist performances, venue events, etc.

negative filter criteria;

music streaming services;

Artist criteria;

Similarity to other artists

Brand-related criteria such as, for example, branding information related to (or associated with) one or more of the following (or combinations thereof): Song; Artist; Team; Celebrity; Album; Venue; Trademarks; Corporate Identities; Content owners; Publisher; Author; Distributor; Digital Content Criteria; Etc.

Various embodiments disclosed herein may be configured, designed, or otherwise operable to initiate, perform and/or provide different types of advantages, benefits and/or other features such as, for example, one or more advantages and/or benefits described and/or referenced herein.

For example, in at least one embodiment, the MMMS System functionality may be operable to perform and/or implement various types of functions, operations, actions, and/or other features such as, for example, one or more of the following (or combinations thereof):

Monitor user behaviors and activities;

Identify brand-related information associated with user-accessible content that the user is accessing; has requested access to; and/or has interest in;

Identify songs and/or artists based on specified criteria;

Manage and track revenue sharing;

Manage reporting;

Transact online ordering and purchasing;

Transact Database queries/responses

Acquire and manage artist-related music content and other artist-related information;

Manage artist subscription services;

Create user customized music streaming stations, e.g., based on user-specified filter criteria;

Acquire and manage artist performance event and related venue information;

Provide query disambiguation;

Provide input correction/suggestion functionality such as, for example, normalization of brand name, brand identity and/or other searchable criteria amongst misspelled and/or other spelling variations;
Facilitate artist profile management and user subscriptions;
Manage and track songs and/or other media content which has been streamed to user(s);
Etc.

According to specific embodiments, multiple instances or threads of the MMMS System functionality may be concurrently implemented and/or initiated via the use of one or more processors and/or other combinations of hardware and/or hardware and software. For example, in at least some embodiments, various aspects, features, and/or functionalities of the MMMS System mechanism(s) may be performed, implemented and/or initiated by one or more of the various systems, components, systems, devices, procedures, and/or processes described herein.

According to different embodiments, one or more different threads or instances of the MMMS System functionality may be initiated in response to detection of one or more conditions or events satisfying one or more different types of minimum threshold criteria for triggering initiation of at least one instance of the MMMS System functionality. Various examples of conditions or events which may trigger initiation and/or implementation of one or more different threads or instances of the MMMS System functionality may include, but are not limited to, one or more of the following (or combinations thereof):

Detection of user interest in particular artist, brand, genre, geographic location and/or other criteria
Identification of user;
Identification of music content matching specified criteria;
Detection of user input;
Identification of artist performance event(s) matching specified criteria;
Detection of artist input;
Identification of artist performance event(s);
Identification of user's geographic location;
Determination of revenue sharing distributions;
Receiving database query communication from external server;
Etc.

In at least one embodiment, a given instance of the MMMS System functionality may access and/or utilize information from one or more associated databases. In at least one embodiment, at least a portion of the database information may be accessed via communication with one or more local and/or remote memory devices. Examples of different types of data which may be accessed by the MMMS System functionality may include, but are not limited to, one or more of the following (or combinations thereof):

Brand-related information;
User behavior and analytic information;
Performance information;
Artist information;
Venue Information;
Artist performance event information;
Geographic location information (e.g., relating to artist performances, events, user location, artist origination, venues, etc.)
Brand related taxonomy information;
Artist subscription information;
Ecommerce related transaction information;
Publisher/Content Provider information;
User profile information;
Artist profile information;
Music inventory information;
Artist-brand association information;
etc.

It may be appreciated that the various embodiments of the MMMS Systems disclosed herein are but a few examples from a wide range of MMMS System embodiments which may be implemented. Other embodiments of the MMMS System (not shown) may include additional, fewer and/or different components/features that those illustrated and described herein.

Figure 3:
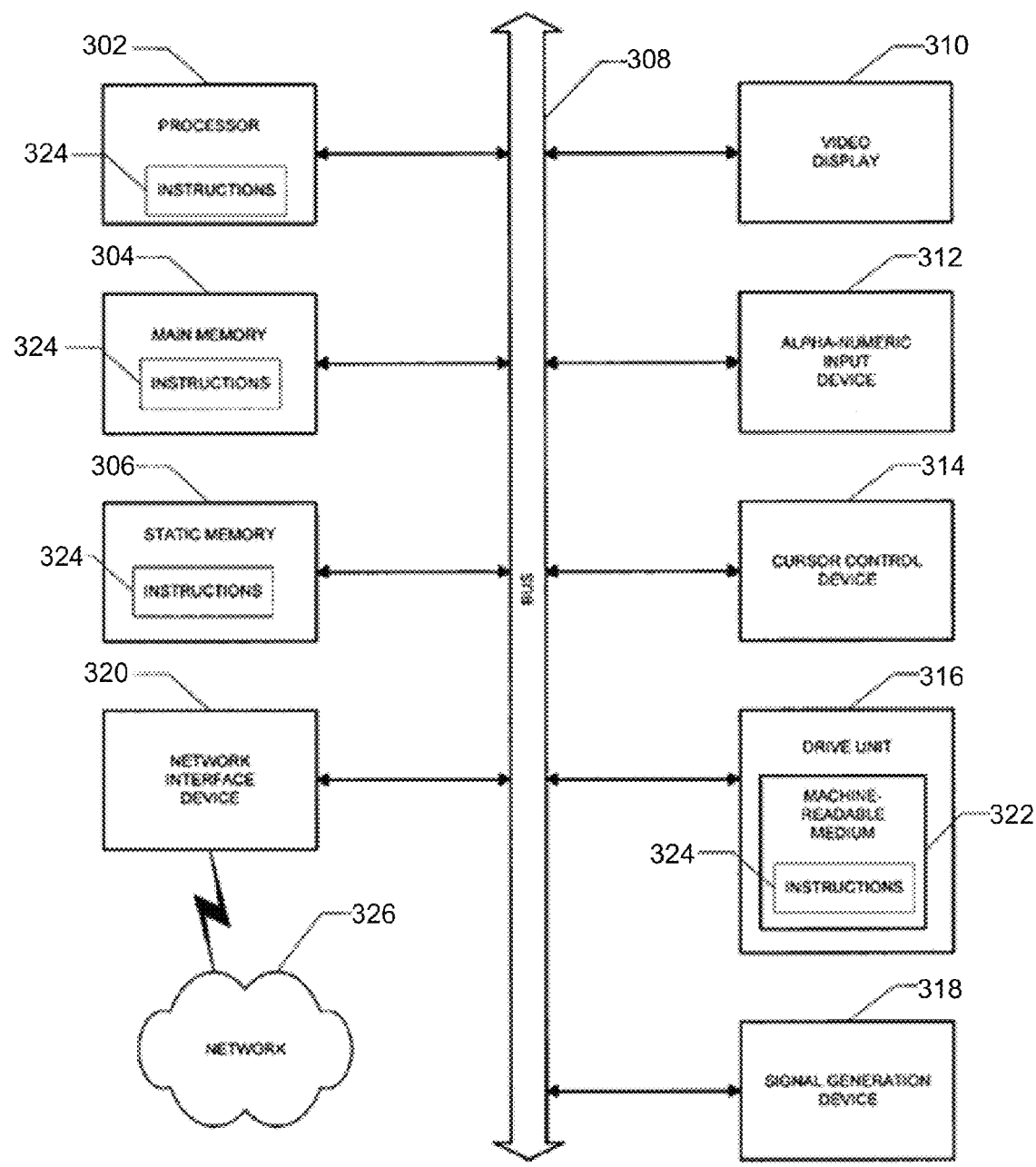
FIG. 3 shows a diagrammatic representation of machine in the exemplary form of a client (or end user) computer system 300.

FIG. 3 shows a diagrammatic representation of machine in the exemplary form of a client (or end user) computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" may also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with at least one other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e. g., HTTP).

While the machine-readable medium 322 is shown in an exemplary embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" may accordingly be taken to include, but not be limited to, solid-state memories, optical and magnetic media, and carrier wave signals. Although an embodiment of the present invention has been described with reference to specific exemplary embodiments, it may be evident that various modifications and changes may be made to these embodiments without departing from the broader spirit and scope of the invention. Accordingly, the specification and drawings are to be regarded in an illustrative rather than a restrictive sense.

According to various embodiments, Client Computer System 300 may include a variety of components, modules and/or systems for providing various types of functionality. For example, in at least one embodiment, Client Computer System 300 may include a web browser application which is operable to process, execute, and/or support the use of scripts (e.g., JavaScript, AJAX, etc.), Plug-ins, executable code, virtual machines, vector-based web animation (e.g., Adobe Flash), etc.

In at least one embodiment, the web browser application may be configured or designed to instantiate components and/or objects at the Client Computer System in response to processing scripts, instructions, and/or other information received from a remote server such as a web server. Examples of such components and/or objects may include, but are not limited to, one or more of the following (or combinations thereof):

User Interface (UI) Components such as those illustrated, described, and/or referenced herein.

Database Components such as those illustrated, described, and/or referenced herein.

Processing Components such as those illustrated, described, and/or referenced herein.

Other Components which, for example, may include components for facilitating and/or enabling the Client Computer System to perform and/or initiate various types of operations, activities, functions such as those described herein.

Figure 4:
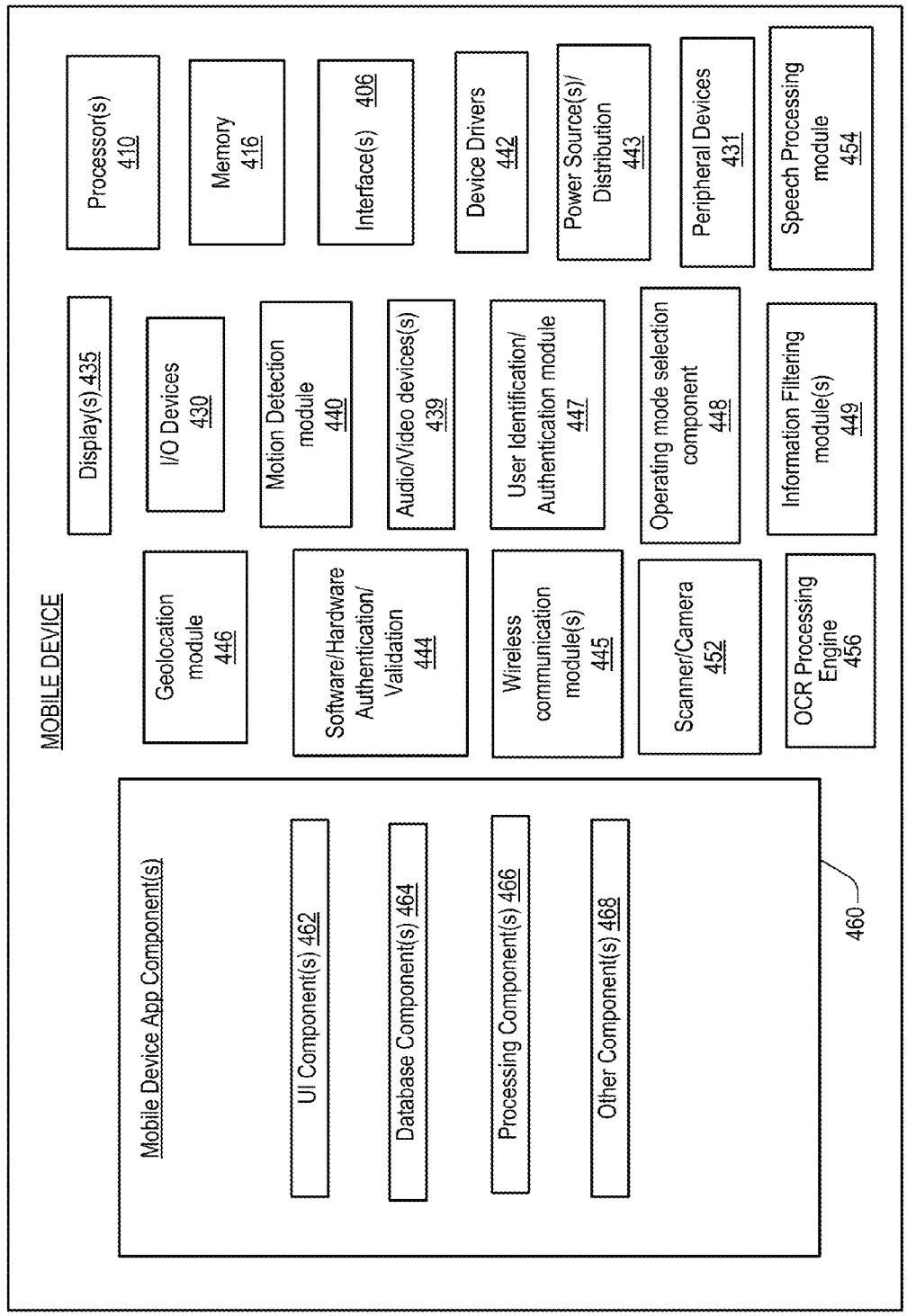
FIG. 4 is a simplified block diagram of an exemplary client system 400 in accordance with a specific embodiment.

FIG. 4 is a simplified block diagram of an exemplary client system 400 in accordance with a specific embodiment. In at least one embodiment, the client system may include MMMS Mobile Device App Component(s) which have been configured or designed to provide functionality for enabling or implementing at least a portion of the various MMMS techniques at the client system.

According to specific embodiments, various aspects, features, and/or functionalities of the Mobile Device may be performed, implemented and/or initiated by one or more of the following types of systems, components, systems, devices, procedures, processes, etc. (or combinations thereof):

Processor(s) 410
Device Drivers 442
Memory 416
Interface(s) 406
Power Source(s)/Distribution 443
Geolocation module 446
Display(s) 435
I/O Devices 430
Audio/Video devices(s) 439
Peripheral Devices 431
Motion Detection module 440
User Identification/Authentication module 447
Client App Component(s) 460
Other Component(s) 468
UI Component(s) 462
Database Component(s) 464
Processing Component(s) 466
Software/Hardware Authentication/Validation 444
Wireless communication module(s) 445
Information Filtering module(s) 449
Operating mode selection component 448
Speech Processing module 454
Scanner/Camera 452
OCR Processing Engine 456
etc.

As illustrated in the example of FIG. 4 Mobile Device 400 may include a variety of components, modules and/or systems for providing various functionality. For example, as illustrated in FIG. 4, Mobile Device 400 may include Mobile Device Application components (e.g., 460), which, for example, may include, but are not limited to, one or more of the following (or combinations thereof):

UI Components 462 such as those illustrated, described, and/or referenced herein.

Database Components 464 such as those illustrated, described, and/or referenced herein.

Processing Components 466 such as those illustrated, described, and/or referenced herein.

Other Components 468 which, for example, may include components for facilitating and/or enabling the Mobile Device to perform and/or initiate various types of operations, activities, functions such as those described herein.

In at least one embodiment, the Mobile Device Application component(s) may be operable to perform and/or implement various types of functions, operations, actions, and/or other features such as, for example, one or more of those described or referenced herein.

According to specific embodiments, multiple instances or threads of the Mobile Device Application component(s) may be concurrently implemented and/or initiated via the use of one or more processors and/or other combinations of hardware and/or hardware and software. For example, in at least some embodiments, various aspects, features, and/or functionalities of the Mobile Device Application component(s) may be performed, implemented and/or initiated by one or more systems, components, systems, devices, procedures, processes, such as, for example, one or more of those described or referenced herein.

According to different embodiments, one or more different threads or instances of the Mobile Device Application component(s) may be initiated in response to detection of one or more conditions or events satisfying one or more different types of minimum threshold criteria for triggering initiation of at least one instance of the Mobile Device Application component(s). Various examples of conditions or events which may trigger initiation and/or implementation of one or more different threads or instances of the Mobile Device Application component(s) may include, but are not limited to, one or more of those described or referenced herein.

In at least one embodiment, a given instance of the Mobile Device Application component(s) may access and/or utilize information from one or more associated databases. In at least one embodiment, at least a portion of the database information may be accessed via communication with one or more local and/or remote memory devices. Examples of different types of data which may be accessed by the Mobile Device Application component(s) may include, but are not limited to, one or more of those described or referenced herein.

According to different embodiments, Mobile Device 400 may further include, but is not limited to, one or more of the following types of components, modules and/or systems (or combinations thereof):

At least one processor 410. In at least one embodiment, the processor(s) 410 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 416, which, for example, may include volatile memory (e.g., RAM), non-volatile memory (e.g., disk memory, FLASH memory, EPROMs, etc.), unalterable memory, and/or other types of memory. In at least one implementation, the memory 416 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the client system and/or other information relating to the functionality of the various MMMS techniques described herein. The program instructions may control the operation of an operating system and/or one or more applications, for example. The memory or memories may also be configured to store data structures, metadata, timecode synchronization information, audio/visual media content, asset file information, keyword taxonomy information, advertisement information, and/or information/data relating to other features/functions described herein. Because such information and program instructions may be employed to implement at least a portion of the MMMS techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 406 which, for example, may include wired interfaces and/or wireless interfaces. In at least one implementation, the interface(s) 406 may include functionality similar to at least a portion of functionality implemented by one or more computer system interfaces such as those described herein and/or generally known to one having ordinary skill in the art. For example, in at least one implementation, the wireless communication interface(s) may be configured or designed to communicate with selected electronic game tables, computer systems, remote servers, other wireless devices (e.g., PDAs, cell phones, player tracking transponders, etc.), etc. Such wireless communication may be implemented using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Device driver(s) 442. In at least one implementation, the device driver(s) 442 may include functionality similar to at least a portion of functionality implemented by one or more computer system driver devices such as those described herein and/or generally known to one having ordinary skill in the art.

At least one power source (and/or power distribution source) 443. In at least one implementation, the power source may include at least one mobile power source (e.g., battery) for allowing the client system to operate in a wireless and/or mobile environment. For example, in one implementation, the power source 443 may be implemented using a rechargeable, thin-film type battery. Further, in embodiments where it is desirable for the device to be flexible, the power source 443 may be designed to be flexible.

Geolocation module 446 which, for example, may be configured or designed to acquire geolocation information from remote sources and use the acquired geolocation information to determine information relating to a relative and/or absolute position of the client system.

Motion detection component 440 for detecting motion or movement of the client system and/or for detecting motion, movement, gestures and/or other input data from user. In at least one embodiment, the motion detection component 440 may include one or more motion detection sensors such as, for example, MEMS (Micro Electro Mechanical System) accelerometers, that may detect the acceleration and/or other movements of the client system as it is moved by a user.

User Identification/Authentication module 447. In one implementation, the User Identification module may be adapted to determine and/or authenticate the identity of the current user or owner of the client system. For example, in one embodiment, the current user may be required to perform a log in process at the client system in order to access one or more features. Alternatively, the client system may be adapted to automatically determine the identity of the current user based upon one or more external signals such as, for example, an RFID tag or badge worn by the current user which provides a wireless signal to the client system for determining the identity of the current user. In at least one implementation, various security features may be incorporated into the client system to prevent unauthorized users from accessing confidential or sensitive information.

One or more display(s) 435. According to various embodiments, such display(s) may be implemented using, for example, LCD display technology, OLED display technology, and/or other types of conventional display technology. In at least one implementation, display(s) 435 may be adapted to be flexible or bendable. Additionally, in at least one embodiment the information displayed on display(s) 435 may utilize e-ink technology (such as that available from E Ink Corporation, Cambridge, Mass., www.eink.com), or other suitable technology for reducing the power consumption of information displayed on the display(s) 435.

One or more user I/O Device(s) 430 such as, for example, keys, buttons, scroll wheels, cursors, touchscreen sensors, audio command interfaces, magnetic strip reader, optical scanner, etc.

Audio/Video device(s) 439 such as, for example, components for displaying audio/visual media which, for example, may include cameras, speakers, microphones, media presentation components, wireless transmitter/receiver devices for enabling wireless audio and/or visual communication between the client system 400 and remote devices (e.g., radios, telephones, computer systems, etc.). For example, in one implementation, the audio system may include componentry for enabling the client system to function as a cell phone or two-way radio device.

Other types of peripheral devices 431 which may be useful to the users of various client systems, such as, for example: PDA functionality; memory card reader(s); fingerprint reader(s); image projection device(s); social networking peripheral component(s); etc.

Information filtering module(s) 449 which, for example, may be adapted to automatically and dynamically generate, using one or more filter parameters, filtered information to be displayed on one or more displays of the mobile device. In one implementation, such filter parameters may be customizable by the player or user of the device. In some embodiments, information filtering module(s) 449 may also be adapted to display, in real-time, filtered information to the user based upon a variety of criteria such as, for example, geolocation information, casino data information, player tracking information, etc.

Wireless communication module(s) 445. In one implementation, the wireless communication module 445 may be configured or designed to communicate with external devices using one or more wireless interfaces/protocols such as, for example, 802.11 (WiFi), 802.15 (including Bluetooth™), 802.16 (WiMax), 802.22, Cellular standards such as CDMA, CDMA2000, WCDMA, Radio Frequency (e.g., RFID), Infrared, Near Field Magnetics, etc.

Software/Hardware Authentication/validation components 444 which, for example, may be used for authenticating and/or validating local hardware and/or software components, hardware/software components residing at a remote device, game play information, wager information, user information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for one or more purposes.

Operating mode selection component 448 which, for example, may be operable to automatically select an appropriate mode of operation based on various parameters and/or upon detection of specific events or conditions such as, for example: the mobile device's current location; identity of current user; user input; system override (e.g., emergency condition detected); proximity to other devices belonging to same group or association; proximity to specific objects, regions, zones, etc. Additionally, the mobile device may be operable to automatically update or switch its current operating mode to the selected mode of operation. The mobile device may also be adapted to automatically modify accessibility of user-accessible features and/or information in response to the updating of its current mode of operation.

Scanner/Camera Component(s) (e.g., 452) which may be configured or designed for use in scanning identifiers and/or other content from other devices and/or objects such as for example: mobile device displays, computer displays, static displays (e.g., printed on tangible mediums), etc.

OCR Processing Engine (e.g., 456) which, for example, may be operable to perform image processing and optical character recognition of images such as those captured by a mobile device camera, for example.

Speech Processing module (e.g., 454) which, for example, may be operable to perform speech recognition, and may be operable to perform speech-to-text conversion.

Etc.

Figure 5:
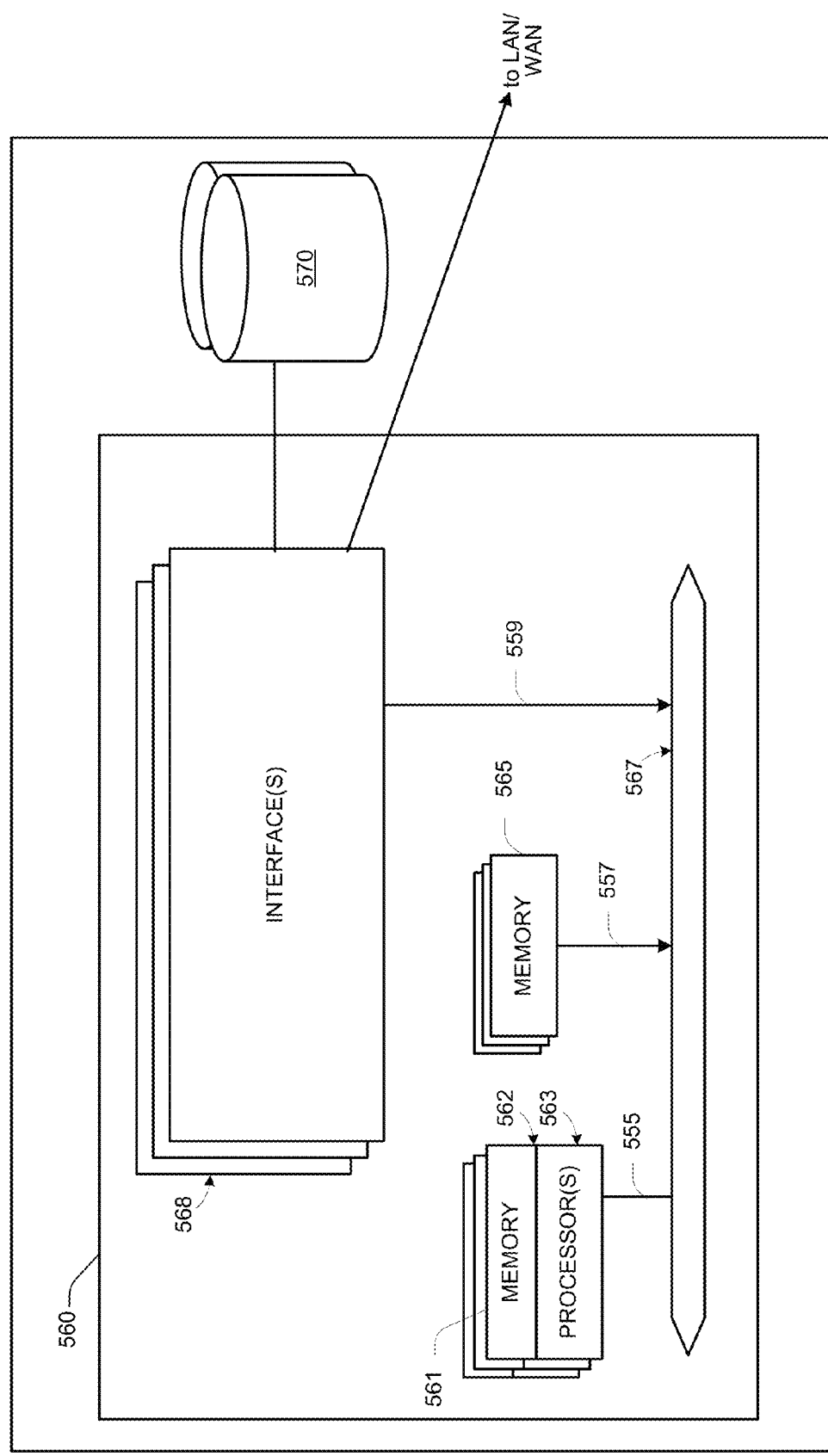
FIG. 5 illustrates an example embodiment of a server system 580 which may be used for implementing various aspects/features described herein.

FIG. 5 illustrates an example embodiment of a server system 580 which may be used for implementing various aspects/features described herein. In at least one embodiment, the server system 580 includes at least one network device 560, and at least one storage device 570 (such as, for example, a direct attached storage device). In one embodiment, server system 580 may be suitable for implementing at least some of the MMMS techniques described herein.

In according to one embodiment, network device 560 may include a master central processing unit (CPU) 562, interfaces 568, and a bus 567 (e.g., a PCI bus). When acting under the control of appropriate software or firmware, the CPU 562 may be responsible for implementing specific functions associated with the functions of a desired network device. For example, when configured as a server, the CPU 562 may be responsible for analyzing packets; encapsulating packets; forwarding packets to appropriate network devices; instantiating various types of virtual machines, virtual interfaces, virtual storage volumes, virtual appliances; etc. The CPU 562 preferably accomplishes at least a portion of these functions under the control of software including an operating system (e.g. Linux), and any appropriate system software (such as, for example, AppLogic™™ software).

CPU 562 may include one or more processors 563 such as, for example, one or more processors from the AMD, Motorola, Intel and/or MIPS families of microprocessors. In an alternative embodiment, processor 563 may be specially designed hardware for controlling the operations of server system 580. In a specific embodiment, a memory 561 (such as non-volatile RAM and/or ROM) also forms part of CPU 562. However, there may be many different ways in which memory could be coupled to the system. Memory block 561 may be used for a variety of purposes such as, for example, caching and/or storing data, programming instructions, etc.

The interfaces 568 may be typically provided as interface cards (sometimes referred to as "line cards"). Alternatively, one or more of the interfaces 568 may be provided as on-board interface controllers built into the system motherboard. Generally, they control the sending and receiving of data packets over the network and sometimes support other peripherals used with the server system 580. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (WiFi) interfaces, 802.15 interfaces (including Bluetooth™), 802.16 (WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

In at least one embodiment, some interfaces may be configured or designed to allow the server system 580 to communicate with other network devices associated with various local area network (LANs) and/or wide area networks (WANs). Other interfaces may be configured or designed to allow network device 560 to communicate with one or more direct attached storage device(s) 570.

Although the system shown in FIG. 5 illustrates one specific network device described herein, it is by no means the only network device architecture on which one or more embodiments may be implemented. For example, an architecture having a single processor that handles communications as well as routing computations, etc. may be used. Further, other types of interfaces and media could also be used with the network device.

Regardless of network device's configuration, it may employ one or more memories or memory modules (such as, for example, memory block 565, which, for example, may include random access memory (RAM)) configured to store data, program instructions for the general-purpose network operations and/or other information relating to the functionality of the various MMMS techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (ROM) and random access memory (RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

FIG. 6 illustrates an example of a functional block diagram of a MMMS Server System in accordance with a specific embodiment. In at least one embodiment, the MMMS Server System may be operable to perform and/or implement various types of functions, operations, actions, and/or other features such as, for example, one or more of those described or referenced herein (e.g., such as those previously described with respect to FIGS. 1 and 2).

In at least one embodiment, the MMMS Server System may include a plurality of components operable to perform and/or implement various types of functions, operations, actions, and/or other features such as, for example, one or more of the following (or combinations thereof):
- Artist Performance and Venue Tracking System(s) 671
- Artist Management System(s) 675
- Station Management System(s) 672
- Content Delivery/Streaming System(s) 673
- Venue Management System(s) 679
- User Management System(s) 675
- Media Storage System(s) 676
- Financial Transaction Server(s) 677
- Media Transcoding Server(s) 678
- Context Interpreter (e.g., 602) which, for example, may be operable to automatically and/or dynamically analyze contextual criteria relating to a given transaction, and automatically determine or identify the type of transaction to be performed. According to different embodiments, examples of contextual criteria which may be analyzed may include, but are not limited to, one or more of the following (or combinations thereof):
  location-based criteria (e.g., geolocation of client device, geolocation of agent device, etc.)
  time-based criteria
  identity of user
  identity of artist
  user profile information
  transaction history information
  recent user activities
  etc.
- Time Synchronization Engine (e.g., 604) which, for example, may be operable to manages universal time synchronization (e.g., via NTP and/or GPS)
- Search Engine (e.g., 628) which, for example, may be operable to search for transactions, logs, items, accounts, options in the TIS databases
- Configuration Engine (e.g., 632) which, for example, may be operable to determine and handle configuration of various customized configuration parameters for one or more devices, component(s), system(s), process(es), etc.
- Time Interpreter (e.g., 618) which, for example, may be operable to automatically and/or dynamically modify or change identifier activation and expiration time(s) based on various criteria such as, for example, time, location, transaction status, etc.
- Authentication/Validation Component(s) (e.g., 647) (password, software/hardware info, SSL certificates) which, for example, may be operable to perform various types of authentication/validation tasks such as, for example, one or more of the following (or combinations thereof):
  verifying/authenticating devices,
  verifying passwords, passcodes, SSL certificates, biometric identification information, and/or other types of security-related information
  verify/validate activation and/or expiration times
  etc.
- Transaction Processing Engine (e.g., 622) which, for example, may be operable to handle various types of transaction processing tasks such as, for example, one or more of the following (or combinations thereof):
  identifying/determining transaction type
  determining which payment gateway(s) to use
  associating databases information to identifiers
  etc.

OCR Processing Engine (e.g., 634) which, for example, may be operable to perform image processing and optical character recognition of images such as those captured by a mobile device camera, for example.

Database Manager (e.g., 626) which, for example, may be operable to handle various types of tasks relating to database updating, database management, database access, etc. In at least one embodiment, the Database Manager may be operable to manage databases, MMMS Device Application databases, etc.

Log Component(s) (e.g., 610) which, for example, may be operable to generate and manage transactions history logs, system errors, connections from APIs, etc.

Status Tracking Component(s) (e.g., 612) which, for example, may be operable to automatically and/or dynamically determine, assign, and/or report updated transaction status information based, for example, on the state of the transaction. In at least one embodiment, the status of a given transaction may be reported as one or more of the following (or combinations thereof): Completed, Incomplete, Pending, Invalid, Error, Declined, Accepted, etc.

Gateway Component(s) (e.g., 614) which, for example, may be operable to facilitate and manage communications and transactions with external Payment Gateways.

Web Interface Component(s) (e.g., 608) which, for example, may be operable to facilitate and manage communications and transactions with TIS web portal(s).

API Interface(s) to MMMS Server System(s) (e.g., 646) which, for example, may be operable to facilitate and manage communications and transactions with API Interface(s) to MMMS Server System(s)

API Interface(s) to 3rd Party Server System(s) (e.g., 648) which, for example, may be operable to facilitate and manage communications and transactions with API Interface(s) to 3rd Party Server System(s)

Ticketing Reservation and Purchasing Component(s) (e.g., 649), which, for example, may be configured or designed to facilitate, initiate and/or perform activities/operations relating to reservation and/or purchasing of tickets to events such as live performances at one or more venues.

OCR Processing Engine (e.g., 634) which, for example, may be operable to perform image processing and optical character recognition of images such as those captured by a mobile device camera, for example.

At least one processor 610. In at least one embodiment, the processor(s) 610 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of the mobile client system. In a specific embodiment, a memory (such as non-volatile RAM and/or ROM) also forms part of CPU. When acting under the control of appropriate software or firmware, the CPU may be responsible for implementing specific functions associated with the functions of a desired network device. The CPU preferably accomplishes one or more these functions under the control of software including an operating system, and any appropriate applications software.

Memory 616, which, for example, may include volatile memory (e.g., RAM), non-volatile memory (e.g., disk memory, FLASH memory, EPROMs, etc.), unalterable memory, and/or other types of memory. In at least one implementation, the memory 616 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile client system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein. Because such information and program instructions may be employed to implement at least a portion of the MMMS System techniques described herein, various aspects described herein may be implemented using machine readable media that include program instructions, state information, etc. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Interface(s) 606 which, for example, may include wired interfaces and/or wireless interfaces. In at least one implementation, the interface(s) 606 may include functionality similar to at least a portion of functionality implemented by one or more computer system interfaces such as those described herein and/or generally known to one having ordinary skill in the art.

Device driver(s) 642. In at least one implementation, the device driver(s) 642 may include functionality similar to at least a portion of functionality implemented by one or more computer system driver devices such as those described herein and/or generally known to one having ordinary skill in the art.

One or more display(s) 635. According to various embodiments, such display(s) may be implemented using, for example, LCD display technology, OLED display technology, and/or other types of conventional display technology. In at least one implementation, display(s) 635 may be adapted to be flexible or bendable. Additionally, in at least one embodiment the information displayed on display(s) 635 may utilize e-ink technology (such as that available from E Ink Corporation, Cambridge, Mass., www.eink.com), or other suitable technology for reducing the power consumption of information displayed on the display(s) 635.

Email Server Component(s) 636, which, for example, may be configured or designed to provide various functions and operations relating to email activities and communications.

Web Server Component(s) 637, which, for example, may be configured or designed to provide various functions and operations relating to web server activities and communications.

Messaging Server Component(s) 638, which, for example, may be configured or designed to provide various functions and operations relating to text messaging and/or other social network messaging activities and/or communications.

Etc.

BandScanner Functionality

Figures 7, 7A, 7B:
Figure 7A:
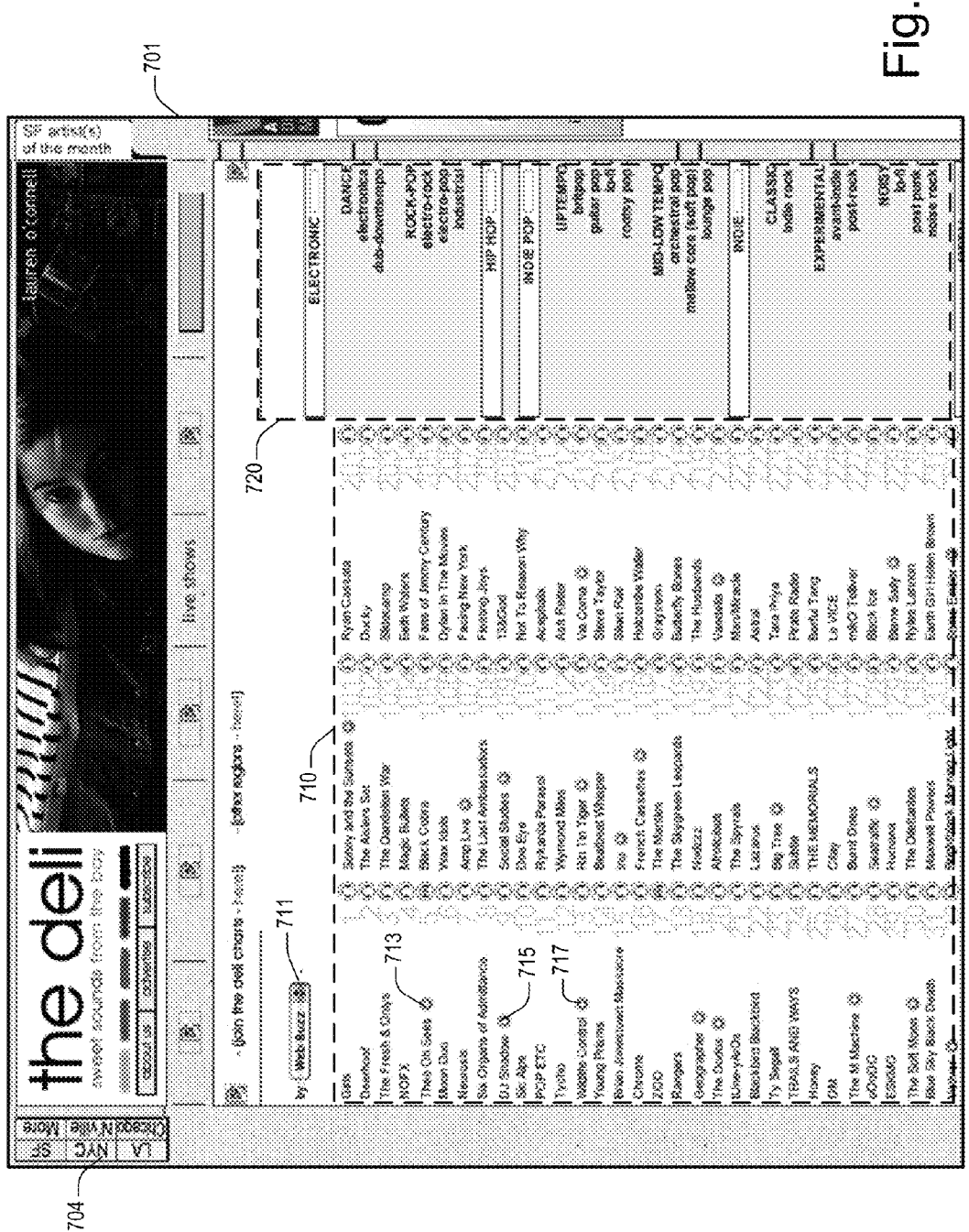
Figure 7B:
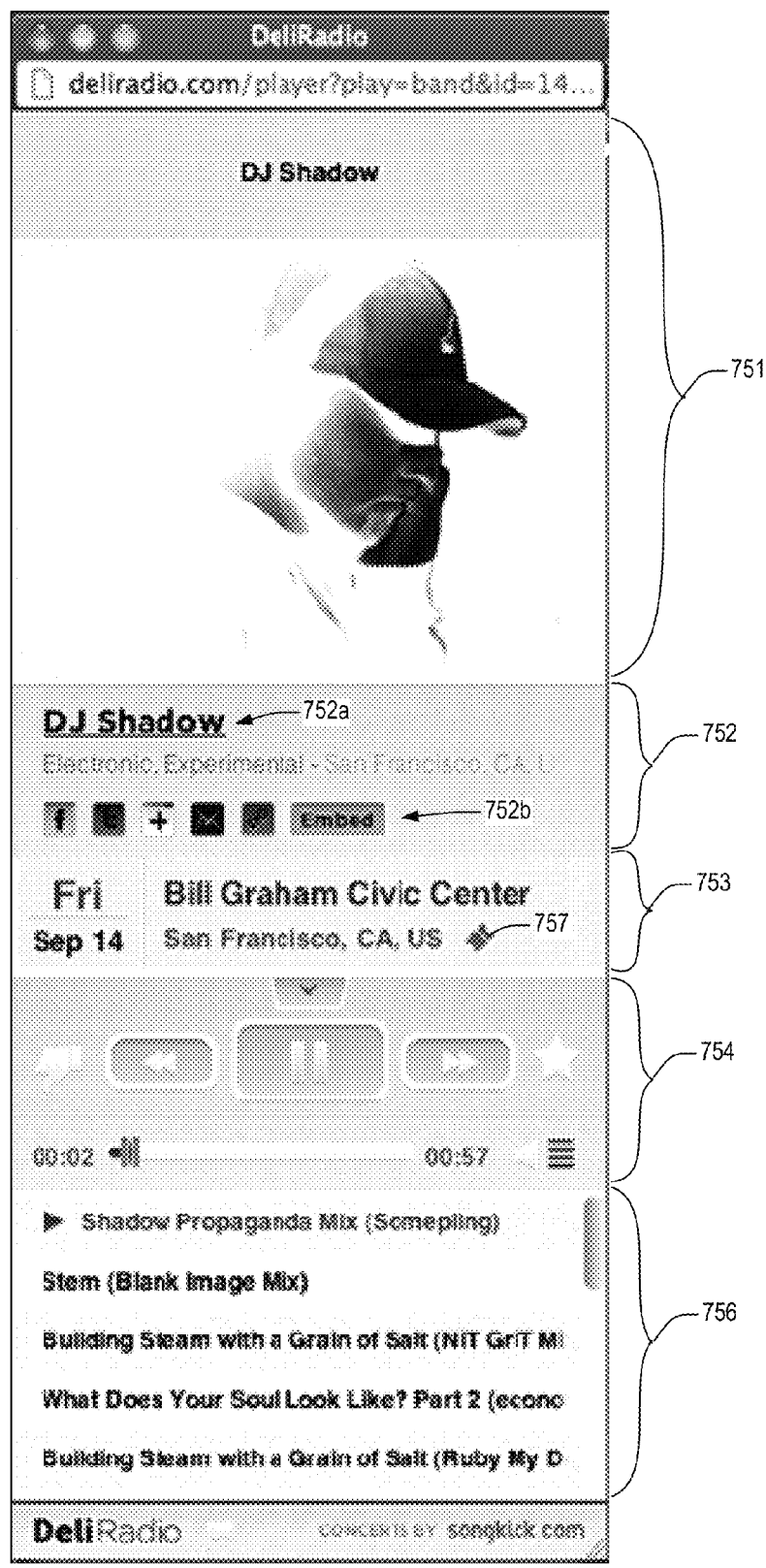

FIG. 7 shows and example screenshot of a graphical user interface (GUI) which has been configured or designed to include BandScanner functionality in accordance with a specific embodiment. As illustrated in the example embodiment of FIG. 7, it is assumed that the user has navigated to a web page which includes displayed content (e.g., FIG. 7A). Additionally in the example embodiment of FIG. 7, it is further assumed that the GUI corresponds to a $3^{rd}$ party web page (e.g., managed by a $3^{rd}$ party content provider) which has been configured or designed to utilize DeliRadio's BandScanner functionality to thereby cause a DeliRadio Pop-Out Player (e.g., FIG. 7B) to automatically be displayed or presented to the user.

In the example embodiment of FIG. 7A, it is assumed that a third party website (and at least a portion of its associated web page(s)) has been configured or designed to implement DeliRadio's "BandScanner" functionality on one or more of its web pages. In at least one embodiment, BandScanner is comprised of javascript code that may be inserted on any page of a third party website that includes references to the names of artists. In other embodiments, at least a portion of the BandScanner functionality may be implemented via a browser plug-in or add-on.

In one embodiment, when executed, the BandScanner code analyzes the webpage content of the third party website, finds references to artist names, and compares those artist names against DeliRadio's database of artist names. When a match is identified, the BandScanner code dynamically and automatically inserts (or causes display of) a "play" button next to the matched artist name displayed on the webpage of the third party, as illustrated, for example, at 713, 715, and 717 of FIG. 7A. When a play button (e.g., 715) is clicked or selected by a website visitor (e.g., a user), this may cause a DeliRadio Pop Out Player to open at the user's system and begin playing streamed music from (or relating to) the matched artist. In at least one embodiment, when the user clicks on selected play button, it causes the user's system to sends a request to the DeliRadio System to create a radio station for the identified artist. The DeliRadio System may respond by causing DeliRadio Player GUI (e.g., FIG. 7B) to be displayed at the user's system and begin playing streamed music from (or relating to) the matched artist.

For example, as illustrated in the example embodiment of FIG. 7, it is assumed that the user has clicked on the "Play" button 713 (corresponding to identified artist "DJ Shadow") which has been dynamically displayed on web page 701 via the BandScanner functionality. In response, a DeliRadio Player GUI (750) is opened at the user's system, and is configured to play, at the user's system, streaming music performed by the artist DJ Shadow.

In some embodiments, at least a portion of the BandScanner code may be implemented at the user's system, such as, for example, during a rendering of the $3^{rd}$ party webpage, or via use of a browser plug-in or add-on, via execution of software at the user's system, etc. In at least one embodiment, when executed at the user's system, the BandScanner code may dynamically analyze the webpage content to be displayed in order to identify references to artist names. In some embodiments, the BandScanner code may dynamically query the DeliRadio System to identify any artist matches. If an artist match is detected, the BandScanner code may cause a "play" button to be dynamically and automatically inserted or displayed on the webpage, such as, for example, next to the matching artist name which is displayed on the webpage.

In some embodiments, the BandScanner functionality may also be configured or designed to enable additional, user-customized content to be dynamically included in (or presented as part of) the webpage content which is displayed to the user (via the user's system). For example, in some embodiments, additional content (e.g., customized, user-specific content) could be automatically and dynamically displayed to the user such as, for example,

- upcoming tour date(s) (e.g., in the user's geographic location) for one or more artists identified on the webpage;
- ticket availability information for one or more artists identified on the webpage;
- ticket purchasing button for one or more artists identified on the webpage;
- venue information relating to upcoming tour date(s) for one or more artists identified on the webpage;
- and/or other types of information and/or content relating to one or more artists identified on the webpage, including, but not limited to, various types of information and/or content described and/or referenced herein.

For example, in one embodiment, the BandScanner functionality may be configured or designed to identify the user's approximate geographic location (e.g., using the user's IP address and/or user's profile information), and use the identified geographic location to identify and display dynamically generated content relating to upcoming tour date(s) for one or more artists identified on the displayed webpage. In some embodiments, the BandScanner functionality may also be configured or designed to dynamically generate and display ticket purchasing button(s) which the user may click on to initiate purchase of event ticket(s) for one or more identified artists (e.g., as shown, for example, at 757, FIG. 7B). According to different embodiments, when the ticket link/button is clicked by the user, one or more of the following types of operations may be performed:

- the user's web browser may be directed to the DeliRadio artist profile page where more information relating to the artist's tour dates can be viewed;
- the user's web browser may be directed to a specific "event" page for the next event or show which is closest (e.g., either in time or geographic proximity) to the viewer, where tickets can be bought;
- the user's web browser may be directed to the venue website to for the show which is associated with the ticket link/button which was clicked on by the user;
- etc.

According to specific embodiments, other aspects of the BandScanner functionality may include, but are not limited to, one or more of the following (or combinations thereof):

- Displaying a "Play All" button which may be used to create and play a customized streaming radio station which includes all (or selected) bands/artists identified on the third party webpage.
- Providing Automatic vs. Delimited functionality—For example, BandScanner functionality may be configured or designed to work automatically (e.g., without requiring filter or search criteria from the user); or it can focus on a specific filter/search criteria provided by the user.
- Ticket Link or Ticket Icon next to Play Button.

In addition, the operator of the third party website may also use BandScanner to create one or more DeliRadio music station(s) which includes one or more artists referenced on the third party web page on which the BandScanner code has been implemented. The operator of the third party website may control where on the web page the link to this DeliRadio station is placed or embedded. When a visitor to the web page clicks on this link, a DeliRadio Player GUI (e.g., FIG. 7B) may dynamically open and play streaming one or more artists referenced on the page. According to different embodiments, examples of different types of third party entities or websites which may use the BandScanner feature(s) may include, but are not limited to, one or more of those relating to: venues, festivals, music blogs, ticketing companies, music charts, city or regional "free weeklies," etc.

FIGS. 7A and 7B show the DeliRadio Pop-Out Player that has opened when a visitor to a third party website (which has been configured or designed to use BandScanner functionality) has clicked on the play button next to an artist's name on that website.

As illustrated in the example embodiment of FIG. 7B, the DeliRadio Player GUI 750 may display a variety of content, and may be configured or designed to provide various types of functionality. For example, as illustrated in the example embodiment of FIG. 7B, the DeliRadio Player GUI 750 may include functionality for facilitating, initiating, and/or performing one or more of the following operation(s)/action(s) (or combinations thereof): one or more of the following features (or combinations thereof):

- Display Station name (DJ Shadow) and related artist information (e.g., 752).
- Display and plays a list of songs (e.g., 756) which have been selected based on the identified matching artist information.
- Enable the user may listen to the songs in the order played by the system, or randomly access any song of his/her choosing.
- Display artist-related event information (e.g., 753) such as, for example, upcoming show/tour date(s), venue location information; link to buy tickets to selected show(s).
- Display link(s) or object(s) (e.g., ticket object 757) which enable the user to purchase tickets to upcoming show(s) for the identified artist.
- Display photos, videos, and/or other content (751) relating to the identified artist.
- Enables users to pause/restart playback, adjust playback volume, and skip from point to point within the song (e.g., via player control interface 754).
- Enables users to share the station to their social network profiles, email station URL to a friend, copy the station URL to the computer clipboard, or obtain the necessary code to embed the Station Player GUI on a website (e.g., 752*b*).
- Display a hyperlinked artist name (e.g., 752*a*) to visit the band's full DeliRadio profile.

FIG. 9A illustrates an example embodiment of a portion of BandScanner code 900 that may be inserted by the third party website or webpage (e.g., at the beginning of the code for the web page) for enabling BandScanner functionality on that particular website/webpage. In at least one embodiment, execution of code 900 may insert the most recent version of the DeliRadio BandScanner code from DeliRadio's servers; insert an external library (e.g., hosted by an entity such as Google); and/or may initializes the script, passing along any configuration options that the third party website operator may desire. In at least one embodiment, the second link displayed in the code portion of FIG. 9A links to and automatically incorporates additional code which is hosted on DeliRadio's servers. One example embodiment of this additional code is illustrated in FIG. 9B.

FIG. 9B illustrates an example embodiment of a portion of additional BandScanner code 950 that may be included on the third party website/webpage to facilitate communication between the operator's website and the DeliRadio Server System. In at least one embodiment, at least a portion of the communication may be conducted via use of a DeliRadio BandScanner API. The code illustrated in FIG. 9B, and/or alternate embodiments thereof, may be hosted on DeliRadio servers and may be automatically inserted in the code illustrated in FIG. 9A, which is incorporated on the third party website.

Figure 8:

FIG. 8 represents an alternate embodiment of a third party website incorporating DeliRadio's BandScanner code, and illustrates various ways in which BandScanner functionality may be implemented. As illustrated in the example embodiment of FIG. 8, as shown at 805, 806, the website operator may constrain the DeliRadio BandScanner to search within a particular tag or tags, in first case, the <H1> header tag. Only artist names within the designated tag may be searched and activated (e.g., with a dynamic "Play" button). The play button graphic automatically scales to match the line-height of the parent element, resulting in a larger button to accompany larger text.

In a second example, as shown at 801-804, the website operator has simply typed an artist name within the specific delimiter that the BandScanner functionality knows to look for. Any text within the double-square-brackets may be scanned for artist names, and the entire string of text may be turned into a link to a DeliRadio Pop-Out Player.

Figure 10:
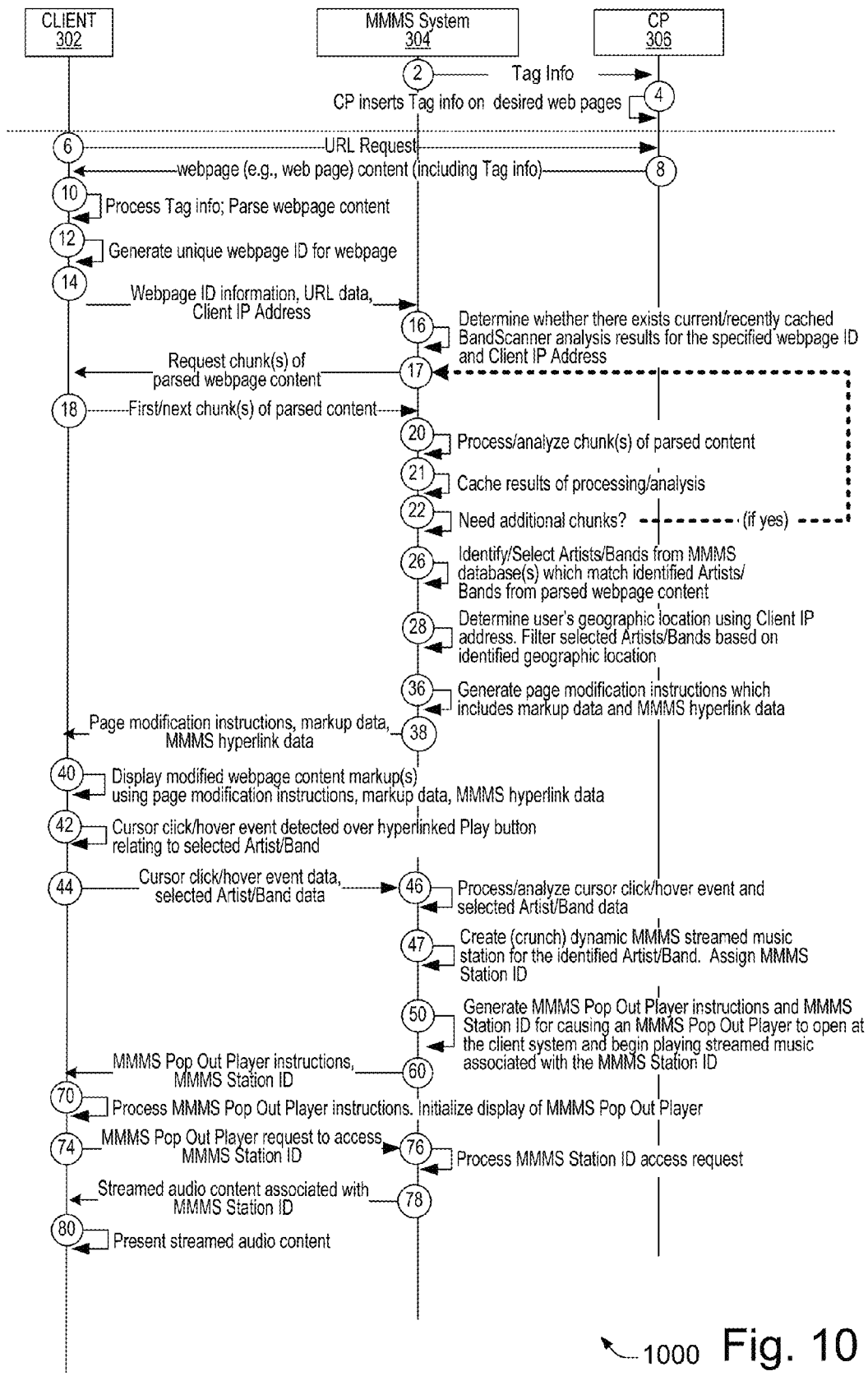
FIG. 10 shows a flow diagram of an example alternate embodiment which may be used for implementing one or more aspects of BandScanner functionality.

FIG. 10 shows a flow diagram of an example alternate embodiment which may be used for implementing one or more aspects of BandScanner functionality. As illustrated in the example embodiment of FIG. 10, the MMMS System 304 provides (2) tag information (e.g., which may include includes the Content Provider ID as well as other scripted instructions) to the Content Provider server (CP) 306 (also referred to herein as "3$^{rd}$ Part Website" or "Website operator"). In at least one implementation, the Content Provider may utilize the tag information to generate one or more tags to be inserted or embedded (4) into one or more of the Content Provider's webpages, as desired by the Content Provider. In at least one embodiment, each embedded tag may include information relating to the Content Provider ID.

In one embodiment, dynamic content tags may be inserted or embedded as different distinct tags into each of the selected webpages. Alternatively, the tag information may be inserted into the page via a tag that is already embedded in each of the desired pages such as, for example, and ad server tag or an application server tag. In at least one embodiment, once present on the page, the tag may be served as part of the page that is served from the Content Provider's web server(s). In at least some embodiments, the tag on the Content Provider's page may include instructions for enabling the MMMS-related tag information to be dynamically served (e.g., by 3rd party server) to client system.

As illustrated in the example embodiment of FIG. 10, it is assumed at (6) that a user at the client system 302 has initiated a URL request to view a particular webpage such as, for example, www.rollingstone.com. Such a request may be initiated, for example, via the Internet using an Internet browser application at the client system.

In at least one embodiment, when the URL request is received at the Content Provider server 306, the server responds by transmitting or serving (8) webpage content, including the tag information, to the client system 302.

As shown at (10), the client system processes the tag information. In at least one embodiment, at least a portion of the received tag information may be processed by the client system's web browser application.

In at least one embodiment, the processing of the tag information at the client system may cause the client system to automatically and dynamically parse (10) the received webpage content and/or to generate one or more chunks of plain text based upon the parsed content. In at least one embodiment, the parsing of webpage or document content may include, but is not limited to, one or more of the following (or combinations thereof):

- Identifying main content block of a target document
- Extracting semi structured information and clean plain text
- Converting HTML to clean plain text
- Removing all (or selected) menus, advertisements, and link boxes etc.
- Generating clean text output of content only, without external noise, while retaining semi structured information such as, for example, titles, bold elements, meta information, etc.
- Performing chunking operations for generating chunks of clean text output which may then be provided to the MMMS System for further contextual search analysis and processing.

In at least one embodiment, at least a portion of the parsing operations performed at the client system may be implemented by a Parser component implemented at the client system. For example, in at least one embodiment, the tag information which is processed at the client system may include executable instructions (e.g., via a scripting language such as, for example, Javascript, ActiveX, etc.) which, when executed, causes the client system to automatically and dynamically parse (10) the received webpage content and/or to generate one or more chunks of plain text based upon the parsed content.

In at least one embodiment, the processing of the tag information at the client system may also cause the client system to automatically generate (12) a unique Webpage ID for the received webpage content, and to transmit (14) the Webpage ID (along with other desired information) to the MMMS System 304. Examples of other types of information which may be sent to the MMMS System (e.g., at 14) may include, but are not limited to, one or more of the following (or combinations thereof):

- Content Provider ID information;
- Webpage URL;
- Client IP Address
- Chunk(s) of parsed content (e.g., first chunk of parsed content)
- etc.

In at least one embodiment, a Webpage ID represents a unique identifier for a specific webpage, and may be generated based upon text, structure and/or other content of that webpage. In at least one embodiment, the first chunk of parsed webpage content may be used as the Webpage ID. In at least one embodiment, the Webpage ID may be based solely upon selected portions of the webpage content for that particular page, and without regard to the identity of the user, identity of the client system, or identity of the Content Provider. However, in at least some embodiments, the Webpage ID may be used to uniquely identify the content associated with specific personalized webpages, customized webpages, and/or dynamically generated webpages, which, for example, may be specifically customized by the Content Provider based on the user's identity and/or preferences.

Upon receiving the Webpage ID information (as well as other related information, if desired), the MMMS System uses the Webpage ID information to determine (16) whether there exists current/recently cached BandScanner analysis results for the specified webpage ID and Client IP Address.

In at least one embodiment, if it is determined there exists current/recently cached BandScanner analysis results for the specified webpage ID and Client IP Address, the MMMS System may choose to forgo new/additional processing and/or analysis of the Source webpage content, and instead use at least a portion of the cached information associated with the identified Webpage ID.

In at least one embodiment (as illustrated, for example, in the specific example embodiments of FIG. 10), if it is determined there does not exist any current/recently cached BandScanner analysis results for the specified webpage ID and Client IP Address, the MMMS System may respond by identifying the URL associated with the Webpage ID, and by retrieving and/or crawling (or by instructing automated agents to crawl) the webpage content corresponding to the identified URL. Alternatively, as illustrated in the example embodiment of FIG. 10, if it is determined there does not exist any current/recently cached BandScanner analysis results for the specified webpage ID and Client IP Address, the MMMS System may respond by transmitting (17) a communication to the client system, requesting or instructing the client system to send or upload a first (or next) chunk of parsed content to the MMMS System.

For example, in the specific example embodiment of FIG. 10, it is assumed (at 15) that the client system has not yet provided any chunks of parsed content to the MMMS System. Accordingly, in a particular example embodiment, the MMMS System may instruct the client to upload the first chunk of parsed webpage content, and the client system may respond by transmitting or uploading (18) a first chunk of parsed webpage content to the MMMS System. In at least one embodiment, each chunk of parsed content may be configured or designed to include about 100-400 characters (e.g., about 200 characters). In some embodiments, the MMMS System may instruct the client system to upload multiple chunk(s) to the MMMS System over one or more sessions. In a different example embodiment, where the client system has previously the first chunk of parsed content, the MMMS System may initially process and analyze the received first chunk of parsed content, and thereafter, may subsequently instruct the client system (if desired) to upload the next chunk of parsed webpage content to the MMMS System.

As illustrated in the example embodiment of FIG. 10, the MMMS System may perform (e.g., in real-time) processing and analysis (20) on the received chunk(s) of parsed webpage content. In at least one embodiment, such processing and analysis may include, for example, identifying references to artist/band names in the processed webpage content; using the identified artist/band name references to search the MMMS database(s) for matching artist/band names identified in the MMMS database(s), etc. As shown at (21), the MMMS System may cache at least a portion of the output data which is generated as a result of the processing and analysis of the received chunks of parsed webpage content.

As shown at (22), the MMMS System may determine (22) whether or not it is desirable or necessary to processes additional chunk(s) of parsed content for the identified webpage. For example, as illustrated in the example embodiment of FIG. 10, if the MMMS System determines that it is desirable or necessary to processes additional chunk(s) of parsed content for the identified Source webpage, the MMMS System may request (17) or instruct the client system to upload a next chunk (chunks) of parsed webpage content to the MMMS System, whereupon the client system may then respond by transmitting (18) or uploading a next chunk(s) of parsed webpage content to the MMMS System. The MMMS System may then process and analyze (20) the next received chunk(s), cache (21) the results, and then determine (22) once again whether or not it is desirable or necessary to processes additional chunk(s) of parsed content for the identified Source webpage.

In at least one embodiment, the MMMS System may continue to request and/or analyze parsed webpage content associated with the webpage URL until the entirety of the parsed webpage content has been analyzed, and/or until the MMMS System has determined that it has acquired/generated sufficient analysis output data to enable the MMMS System to adequately and subsequently perform specifically desired or required operations.

As shown at (26), the MMMS System may identify and/or select Artists/Bands from the MMMS database(s) which match identified Artists/Bands from parsed webpage content.

As shown at (28), the MMMS may determine user's geographic location using Client IP address, and may filter selected Artists/Bands based on the user's identified geographic location.

As shown at (36), the MMMS System may use the identified matching artist/band information to dynamically generate page modification instructions which includes markup data and MMMS hyperlink data. In at least one embodiment, the page modification instructions may cause display of a "play" button next to the matched artist name displayed on the webpage displayed at the client system, as illustrated, for example, at 713, 715, and 717 of FIG. 7A. In one embodiment, when a play button (e.g., 715) is clicked or selected by the user, this may cause a MMMS Pop Out Player to open at the user's system and begin playing streamed music from (or relating to) the matched artist.

As shown at (38) the MMMS System may send the page modification instructions/information to the client system. In a specific embodiment, the webpage modification instructions may include highlight/markup instructions, and MMMS hyperlink data.

As illustrated in the example embodiment of FIG. 10, when the webpage modification instructions are received at the client system, the client system processes the instructions, and in response, modifies (40) the display of the webpage content in accordance with the page modification instructions, which, for example, may cause display of a "play" button next to the matched artist name displayed on the webpage displayed at the client system (e.g., as illustrated, for example, at 713, 715, and 717 of FIG. 7A).

As shown at 42, it is assumed that the client system has detected a cursor click/hover event over one of the hyperlinked MMMS Play buttons relating to (or associated with) a selected Artist/Band identified by the user.

As shown at 44, information relating to the detected cursor click/hover event and selected artist/band data may be automatically transmitted by the client system to the MMMS System.

As shown at 46, the MMMS System may process and analyze the cursor click/hover event and identified Artist/Band data.

As shown at 47, the MMMS System may create (or "crunch") a dynamic MMMS streamed music station for the identified Artist/Band, and may assign a unique MMMS Station ID for this dynamic MMMS streamed music station.

As shown at 50, the MMMS System may Generate MMMS Pop Out Player instructions and MMMS Station ID for causing an MMMS Pop Out Player to open at the client system and begin playing streamed music associated with the MMMS Station ID.

As shown at 60, the MMMS System may provide the MMMS Pop Out Player instructions and MMMS Station ID information to the client system.

As shown at 70, the client system may process the received MMMS Pop Out Player instructions, and initialize display MMMS Pop Out Player at the client system.

As shown at 74, the MMMS Pop Out Player may transmit a request to the MMMS System to access the streamed music station corresponding to the MMMS Station ID. In response, the MMMS System may process (76) the MMMS Station ID access request, and initiate streaming (78) of audio content (and/or other related content/information) associated with the identified MMMS Station ID. In at least one embodiment, the streamed audio content is received at the client system, and presented to the user via a suitable audio presentation component at the client system such as, for example, speakers which are connected to the client system. In at least one embodiment, the streamed audio content may be received at the client system in encoded format, and may be processed by the MMMS Pop Out Player for playback at the client system.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented method for facilitating electronic commerce via a computer network, the method comprising causing at least one processor to execute a plurality of instructions for:

identifying a first portion of document content relating to a first document to be displayed at a client device, the first document being associated with a first webpage;

analyzing, using artist/band-related information from at least one database, the first portion of document content for identification of artist/band related content which is determined to be contextually related to at least one artist/band identified from the at least one database;

identifying, based on the analysis of the first portion of document content, a first identified artist/band which is determined to be contextually related to a first identified portion of content of the first portion of document content;

identifying, using the first identified artist/band, a first set of songs or tracks ("songs/tracks") which are performed by or recorded by the first artist/band;

dynamically creating, using the first set of songs/tracks, a first streaming media playlist, wherein the first streaming media playlist includes a first portion of selected songs/tracks from the identified first set of songs/tracks;

generating, using information relating to the first identified artist/band and using information relating to the first streaming media playlist, a first set of markup instructions for performing markup operations on at least a portion of the first portion of document content to thereby generate a first portion of marked up content, the first set of markup instructions including instructions for displaying a first hyperlinked object adjacent to the first identified portion of content in a manner which conveys an association between the hyperlinked object and the first identified portion of content; and causing the first set of markup instructions to be executed at the client device to thereby cause the first portion of marked up content to be displayed at the client device.

2. The method of claim 1 further comprising causing the at least one processor to execute instructions for:
  causing the first hyperlinked object to be displayed at the client device;
  detecting a first user interaction with the displayed hyperlinked object; and
  initiating, in response to detecting the first user interaction with the displayed hyperlinked object, a streamed playback of one or more of the first portion of selected songs/tracks associated with the streaming media playlist.

3. The method of claim 1 further comprising causing the at least one processor to execute instructions for:
  causing the first hyperlinked object to be displayed at the client device;
  detecting a first user interaction with the displayed hyperlinked object; and
  displaying at the client device, in response to detecting the first user interaction with the displayed hyperlinked object, a streaming media graphical user interface ("Streaming Media GUI"); and
  wherein the Streaming Media GUI is configured or designed to enable an end user to initiate, via interaction with the Streaming Media GUI, a streamed playback of one or more of the first portion of selected songs/tracks associated with the first streaming media playlist.

4. The method of claim 1 further comprising causing the at least one processor to execute instructions for:
  automatically identifying a geographic location of the client device;
  identifying, using the geographic location, a first set of artists or bands ("artists/bands") that are scheduled to perform at least one live performance within a first geographic region, wherein the first geographic region includes the first geographic location;
  accessing, using the identified first set of artists/bands, artist/band tour information relating to upcoming tour date(s) for one or more of the identified first set of artists/bands; and
  causing content relating to a first portion of the artist/band tour information to be displayed at the client device.

5. The method of claim 1 further comprising causing the at least one processor to execute instructions for:
  automatically identifying a geographic location of the client device;
  identifying, based on the analysis of the first portion of document content, a first set of artists/bands which are determined to be contextually related to specifically identified portions of content of the first portion of document content;
  accessing artist/band tour information relating to upcoming tour date(s) for one or more of the identified first set of artists/bands; and
  identifying, using the artist/band tour information, at least one of the identified first set of artists/bands that is scheduled to perform at least one live performance within a first geographic region, wherein the first geographic region includes the first geographic location; and
  causing a first portion of artist/band tour information relating to the at least one of the identified first set of artists/bands to be displayed at the client device.

6. The method of claim 1 further comprising causing the at least one processor to execute instructions for:
  causing the first hyperlinked object to be displayed at the client device;
  detecting a first user interaction with the displayed hyperlinked object; and
  displaying at the client device, in response to detecting the first user interaction with the displayed hyperlinked object, a streaming media graphical user interface ("Streaming Media GUI");
  wherein the Streaming Media GUI is configured or designed to enable an end user to initiate, via interaction with the Streaming Media GUI, a streamed playback of one or more of the first portion of selected songs/tracks associated with the first streaming media playlist;
  automatically identifying a geographic location of the client device;
  identifying, based on the analysis of the first portion of document content, a first set of artists/bands which are determined to be contextually related to specifically identified portions of content of the first portion of document content;
  accessing artist/band tour information relating to upcoming tour date(s) for one or more of the identified first set of artists/bands; and
  identifying, using the artist/band tour information, at least one of the identified first set of artists/bands that is scheduled to perform at least one live performance within a first geographic region, wherein the first geographic region includes the first geographic location; and
  causing a first portion of artist/band tour information relating to the at least one of the identified first set of artists/bands to be displayed at the client device via the Streaming Media GUI.

7. A computer implemented system for facilitating electronic commerce via a computer network, the system comprising causing at least one processor to execute a plurality of instructions for:
  identifying a first portion of document content relating to a first document to be displayed at a client device, the first document being associated with a first webpage;
  analyzing, using artist/band-related information from at least one database, the first portion of document content for identification of artist/band related content which is determined to be contextually related to at least one artist/band identified from the at least one database;
  identifying, based on the analysis of the first portion of document content, a first identified artist/band which is determined to be contextually related to a first identified portion of content of the first portion of document content;
  identifying, using the first identified artist/band, a first set of songs or tracks ("songs/tracks") which are performed by or recorded by the first artist/band;
  dynamically creating, using the first set of songs/tracks, a first streaming media playlist, wherein the first streaming media playlist includes a first portion of selected songs/tracks from the identified first set of songs/tracks;
  generating, using information relating to the first identified artist/band and using information relating to the first streaming media playlist, a first set of markup instructions for performing markup operations on at least a portion of the first portion of document content to thereby generate a first portion of marked up content, the first set of markup instructions including instructions for displaying a first hyperlinked object adjacent to the first identified portion of content in a manner which conveys an association between the hyperlinked object and the first identified portion of content; and causing the first set of markup instructions to be executed at the client device to thereby cause the first portion of marked up content to be displayed at the client device.

8. The system of claim 7 being further operable to cause the at least one processor to execute instructions for:
causing the first hyperlinked object to be displayed at the client device;
detecting a first user interaction with the displayed hyperlinked object; and
initiating, in response to detecting the first user interaction with the displayed hyperlinked object, a streamed playback of one or more of the first portion of selected songs/tracks associated with the streaming media playlist.

9. The system of claim 7 being further operable to cause the at least one processor to execute instructions for:
causing the first hyperlinked object to be displayed at the client device;
detecting a first user interaction with the displayed hyperlinked object; and
displaying at the client device, in response to detecting the first user interaction with the displayed hyperlinked object, a streaming media graphical user interface ("Streaming Media GUI"); and
wherein the Streaming Media GUI is configured or designed to enable an end user to initiate, via interaction with the Streaming Media GUI, a streamed playback of one or more of the first portion of selected songs/tracks associated with the first streaming media playlist.

10. The system of claim 7 being further operable to cause the at least one processor to execute instructions for:
automatically identifying a geographic location of the client device;
identifying, using the geographic location, a first set of artists or bands ("artists/bands") that are scheduled to perform at least one live performance within a first geographic region, wherein the first geographic region includes the first geographic location;
accessing, using the identified first set of artists/bands, artist/band tour information relating to upcoming tour date(s) for one or more of the identified first set of artists/bands; and
causing content relating to a first portion of the artist/band tour information to be displayed at the client device.

11. The system of claim 7 being further operable to cause the at least one processor to execute instructions for:
automatically identifying a geographic location of the client device;
identifying, based on the analysis of the first portion of document content, a first set of artists/bands which are determined to be contextually related to specifically identified portions of content of the first portion of document content;
accessing artist/band tour information relating to upcoming tour date(s) for one or more of the identified first set of artists/bands; and
identifying, using the artist/band tour information, at least one of the identified first set of artists/bands that is scheduled to perform at least one live performance within a first geographic region, wherein the first geographic region includes the first geographic location; and
causing a first portion of artist/band tour information relating to the at least one of the identified first set of artists/bands to be displayed at the client device.

12. The system of claim 7 being further operable to cause the at least one processor to execute instructions for:
causing the first hyperlinked object to be displayed at the client device;
detecting a first user interaction with the displayed hyperlinked object; and
displaying at the client device, in response to detecting the first user interaction with the displayed hyperlinked object, a streaming media graphical user interface ("Streaming Media GUI");
wherein the Streaming Media GUI is configured or designed to enable an end user to initiate, via interaction with the Streaming Media GUI, a streamed playback of one or more of the first portion of selected songs/tracks associated with the first streaming media playlist;
automatically identifying a geographic location of the client device;
identifying, based on the analysis of the first portion of document content, a first set of artists/bands which are determined to be contextually related to specifically identified portions of content of the first portion of document content;
accessing artist/band tour information relating to upcoming tour date(s) for one or more of the identified first set of artists/bands; and
identifying, using the artist/band tour information, at least one of the identified first set of artists/bands that is scheduled to perform at least one live performance within a first geographic region, wherein the first geographic region includes the first geographic location; and
causing a first portion of artist/band tour information relating to the at least one of the identified first set of artists/bands to be displayed at the client device via the Streaming Media GUI.

13. A system for facilitating electronic commerce via a computer network, the system comprising:
means for identifying a first portion of document content relating to a first document to be displayed at a client device, the first document being associated with a first webpage;
means for analyzing, using artist/band-related information from at least one database, the first portion of document content for identification of artist/band related content which is determined to be contextually related to at least one artist/band identified from the at least one database;
means for identifying, based on the analysis of the first portion of document content, a first identified artist/band which is determined to be contextually related to a first identified portion of content of the first portion of document content;
means for identifying, using the first identified artist/band, a first set of songs or tracks ("songs/tracks") which are performed by or recorded by the first artist/band;
means for dynamically creating, using the first set of songs/tracks, a first streaming media playlist, wherein the first streaming media playlist includes a first portion of selected songs/tracks from the identified first set of songs/tracks;
means for generating, using information relating to the first identified artist/band and using information relating to the first streaming media playlist, a first set of markup instructions for performing markup operations on at least a portion of the first portion of document content to thereby generate a first portion of marked up content, the first set of markup instructions including instructions for displaying a first hyperlinked object adjacent to the first identified portion of content in a manner which conveys an association between the hyperlinked object and the first identified portion of content; and means for causing the first set of markup instructions to be executed at the client device to thereby cause the first portion of marked up content to be displayed at the client device.

14. The system of claim 13 further comprising:

means for causing the first hyperlinked object to be displayed at the client device;

means for detecting a first user interaction with the displayed hyperlinked object; and means for initiating, in response to detecting the first user interaction with the displayed hyperlinked object, a streamed playback of one or more of the first portion of selected songs/tracks associated with the streaming media playlist.

15. The system of claim 13 further comprising:

means for causing the first hyperlinked object to be displayed at the client device;

means for detecting a first user interaction with the displayed hyperlinked object; and means for displaying at the client device, in response to detecting the first user interaction with the displayed hyperlinked object, a streaming media graphical user interface ("Streaming Media GUI"); and wherein the Streaming Media GUI is configured or designed to enable an end user to initiate, via interaction with the Streaming Media GUI, a streamed playback of one or more of the first portion of selected songs/tracks associated with the first streaming media playlist.

16. The system of claim 13 further comprising:

means for automatically identifying a geographic location of the client device;

means for identifying, using the geographic location, a first set of artists or bands ("artists/bands") that are scheduled to perform at least one live performance within a first geographic region, wherein the first geographic region includes the first geographic location;

means for accessing, using the identified first set of artists/bands, artist/band tour information relating to upcoming tour date(s) for one or more of the identified first set of artists/bands; and means for causing content relating to a first portion of the artist/band tour information to be displayed at the client device.

17. The system of claim 13 further comprising:

means for automatically identifying a geographic location of the client device;

means for identifying, based on the analysis of the first portion of document content, a first set of artists/bands which are determined to be contextually related to specifically identified portions of content of the first portion of document content;

means for accessing artist/band tour information relating to upcoming tour date(s) for one or more of the identified first set of artists/bands; and means for identifying, using the artist/band tour information, at least one of the identified first set of artists/bands that is scheduled to perform at least one live performance within a first geographic region, wherein the first geographic region includes the first geographic location; and means for causing a first portion of artist/band tour information relating to the at least one of the identified first set of artists/bands to be displayed at the client device.

* * * * *